United States Patent
Iijima et al.

(10) Patent No.: US 8,373,776 B2
(45) Date of Patent: Feb. 12, 2013

(54) IMAGE PROCESSING APPARATUS AND IMAGE SENSING APPARATUS

(75) Inventors: Yasuhiro Iijima, Osaka (JP); Haruo Hatanaka, Osaka (JP); Shimpei Fukumoto, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 451 days.

(21) Appl. No.: 12/636,171

(22) Filed: Dec. 11, 2009

(65) Prior Publication Data

US 2010/0149384 A1    Jun. 17, 2010

(30) Foreign Application Priority Data

Dec. 12, 2008   (JP) .................. 2008-316667

(51) Int. Cl.
*H04N 5/217* (2006.01)
*H04N 5/262* (2006.01)
*H04N 5/235* (2006.01)
*G06K 9/40* (2006.01)

(52) U.S. Cl. ......... 348/241; 348/239; 348/362; 382/254
(58) Field of Classification Search .................. 348/241, 348/208.99, 208.1, 208.4, 208.12, 208.13, 348/239, 362, 222.1; 396/52, 55; 382/254, 382/255

See application file for complete search history.

(56) References Cited

U.S. PATENT DOCUMENTS

| | | | | |
|---|---|---|---|---|
| 8,115,818 B2* | 2/2012 | Sawada | .................. | 348/208.13 |
| 2002/0122133 A1* | 9/2002 | Ejima | ........................ | 348/362 |
| 2004/0066460 A1* | 4/2004 | Kondo et al. | .............. | 348/222.1 |
| 2007/0122139 A1 | 5/2007 | Nomura et al. | | |
| 2008/0050031 A1* | 2/2008 | Itoh et al. | ...................... | 382/260 |
| 2008/0166115 A1* | 7/2008 | Sachs et al. | ..................... | 396/55 |
| 2008/0240607 A1* | 10/2008 | Sun et al. | ...................... | 382/275 |
| 2008/0259175 A1 | 10/2008 | Muramatsu et al. | | |
| 2008/0267530 A1* | 10/2008 | Lim | ............................. | 382/284 |
| 2008/0316334 A1 | 12/2008 | Lee et al. | | |
| 2009/0115858 A1 | 5/2009 | Lee | | |
| 2009/0115859 A1* | 5/2009 | Lee | ............................. | 348/208.4 |
| 2009/0179995 A1* | 7/2009 | Fukumoto et al. | .......... | 348/208.6 |
| 2009/0284610 A1* | 11/2009 | Fukumoto et al. | ....... | 348/208.99 |
| 2010/0026839 A1* | 2/2010 | Border et al. | .............. | 348/222.1 |
| 2010/0053349 A1* | 3/2010 | Watanabe et al. | .......... | 348/222.1 |
| 2010/0231748 A1* | 9/2010 | Takeda | ........................ | 348/229.1 |

FOREIGN PATENT DOCUMENTS

| | | |
|---|---|---|
| JP | 2001346093 | 12/2001 |
| JP | 2002258351 | 9/2002 |

(Continued)

OTHER PUBLICATIONS

Japanese Office Action issued Dec. 25, 2012 in corresponding Japanese application No. 2008-316667.

(Continued)

*Primary Examiner* — Nhan T Tran
(74) *Attorney, Agent, or Firm* — NDQ&M Watchstone LLP

(57) ABSTRACT

An image processing apparatus outputs an output image by synthesizing a first image obtained by shooting, a second image obtained by shooting with an exposure time longer than the exposure time of the first image, and a third image obtained by reducing noise in the first image. The image processing apparatus has a noise reduction processing control portion which controls the contents of image processing for obtaining the third image from the first image according to the noise level in the first image.

3 Claims, 18 Drawing Sheets

FOREIGN PATENT DOCUMENTS

| | | |
|---|---|---|
| JP | 2002305682 | 10/2002 |
| JP | 2003-9006 A | 1/2003 |
| JP | 2005-20562 A | 1/2005 |
| JP | 2007006021 | 1/2007 |
| JP | 2007049374 | 2/2007 |
| JP | 2007150802 | 6/2007 |
| JP | 2007202098 | 8/2007 |
| JP | 2007324770 | 12/2007 |
| JP | 2008-99069 A | 4/2008 |
| JP | 2009111773 | 5/2009 |
| JP | 2009118483 | 5/2009 |
| JP | 2009118484 | 5/2009 |
| WO | 2007010891 | 1/2007 |

OTHER PUBLICATIONS

English Abstract for JP 2003-9006 A, published Jan. 10, 2003.
English Abstract for JP 2005-20562 A, published Jan. 20, 2005.
English Abstract for JP 2008-99069 A, published Apr. 24, 2008.

* cited by examiner

SHORT-EXPOSURE
IMAGE

SUB  310

PROPER-EXPOSURE
IMAGE

SUB  311

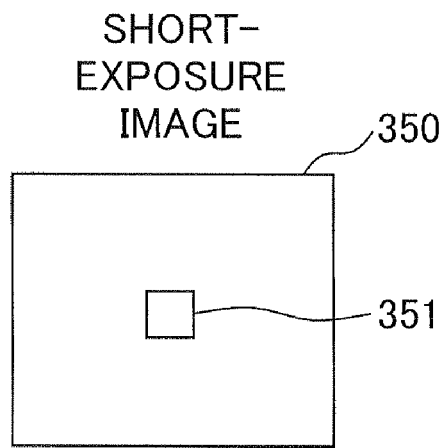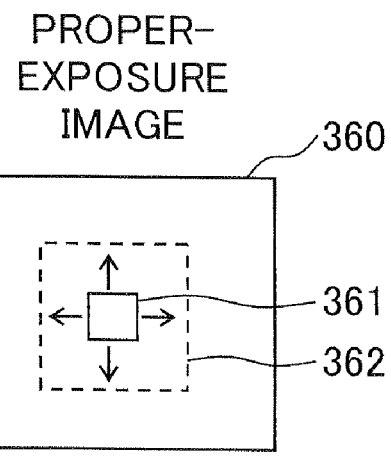

2ND INTERMEDIARY IMAGE

SUB  312

DIFFERENTIAL IMAGE

313

3RD INTERMEDIARY IMAGE

SUB    314

EDGE IMAGE

315

IMAGE PROCESSING APPARATUS AND IMAGE SENSING APPARATUS

This nonprovisional application claims priority under 35 U.S.C. §119(a) on Patent Application No. 2008-316667 filed in Japan on Dec. 12, 2008, the entire contents of which are hereby incorporated by reference.

BACKGROUND OF THE INVENTION

1. Field of the Invention

The present invention relates to image processing apparatuses for applying image processing to an image, and also relates to image sensing apparatuses such as digital still cameras and digital video cameras.

2. Description of Related Art

Recent years have seen eager development of technologies for suppressing image blur ascribable to camera shake or subject movement. Some of such technologies achieve blur correction optically, but optical blur correction requires a sensor for detecting shake and a mechanism for optically compensating for it. Incorporation of such a sensor and a mechanism, however, is disadvantageous in terms of cost and compactness. This has led to proposal of various technologies for correcting blur through image processing after shooting.

For example, according to one conventional method, a first image having a high resolution but containing much noise is shot by exposure lasting for a short exposure time and in addition a second image having a low resolution but containing little noise is shot by exposure lasting for a long exposure time. Then, based on the image data of the first and second images, the displacement between the two images is detected; their positions are then so adjusted as to cancel the displacement, and thereafter the first and second images are synthesized to generate a corrected image.

Here, an image region where the differential between the first and second images is large is judged to be an edge region, and there the first image is given a comparatively high synthesis ratio; in contract, an image region where the differential between the first and second images is small is judged to be a non-edge region, and there the second image is given a comparatively high synthesis ratio. This helps generate an image with little blur and little noise.

In edge region judgment based on the differential between a first and a second image, however, not only a true edge but also noise is judged to be an edge. This makes it likely that much of the noise in the first image ends up mixing into the corrected image. This makes important such technologies as reduce mixing of the noise in the first image as much as possible.

Moreover, as a result of the position adjustment mentioned above, as shown in FIG. 24, the position of the entire image region 900 of the first image usually does not completely coincide with the position of the entire image region 901 of the second image, producing a region 902 (the hatched region in FIG. 24) where the two entire image regions 900 and 901 overlap and a region 903 (the dotted region in FIG. 24) where they do not overlap. In this case, from the image data in the overlap region 902 between the first and second images, the image 911 in the overlap region 902 on the corrected image is generated, and from the image data in the non-overlap region 903 on the first image, the image 912 in the non-overlap region 903 on the corrected image is generated; then the generated images 911 and 912 are fitted (joined) together, and thus the angle of view (field of view) of the corrected image is made identical with that of the first image.

Inconveniently, in this case, since the image in the overlap region on the corrected image and the image in the non-overlap region on it are generated by different methods, if no additional processing is performed, the fitting boundary on the corrected image may be visible (the difference in noise level between the overlap and non-overlap regions may be visible).

SUMMARY OF THE INVENTION

A first image processing apparatus according to the invention generates an output image by synthesizing a first image obtained by shooting, a second image obtained by shooting with an exposure time longer than the exposure time of the first image, and a third image obtained by reducing noise in the first image, and is provided with a noise reduction processing control portion which controls the contents of image processing for obtaining the third image from the first image according to the noise level in the first image.

Specifically, for example, the above-described first image processing apparatus according to the invention is provided with a plurality of mutually different noise reduction portions which reduce noise in the first image; the noise reduction processing control portion selects one of the plurality of noise reduction portions according to the noise level in the first image, and the third image is generated as a result of the selected noise reduction portion reducing noise in the first image.

For another example, in the above-described first image processing apparatus according to the invention, the third image is generated by applying predetermined noise reduction processing to the first image once or more times, and the noise reduction processing control portion varies how many times the noise reduction processing is applied to the first image according to the noise level in the first image.

For another example, the above-described first image processing apparatus according to the invention is further provided with: a position adjustment portion which adjusts the positions of the first and second images; a first synthesis portion which generates a fourth image by synthesizing, at a synthesis ratio based on the difference between the third image and the position-adjusted second image, the third image and the position-adjusted second image; and a second synthesis portion which generates the output image by synthesizing, at a synthesis ratio based on the intensity of an edge contained in the first or third image, the first image and the fourth image.

A second image sensing apparatus according to the invention is provided with: a position adjustment portion which adjusts the positions of a first image obtained by shooting and a second image obtained by shooting with an exposure time longer than the exposure time of the first image; a noise reduction portion which identifies an overlap region and a non-overlap region between the image regions of the position-adjusted first and second images, and which then performs first noise reduction processing on the image within the overlap region on the first image to generate a first noise-reduced image and performs second noise reduction processing different from the first noise reduction processing on the image within the non-overlap region on the first image to generate a second noise-reduced image; and a joining portion which generates an output image by synthesizing, on one hand, a synthesized image obtained by synthesizing the image within the overlap region on the first and second images and the first noise-reduced image and, on the other hand, the second noise-reduced image.

A third image sensing apparatus according to the invention generates, from a first image obtained by shooting and a second image obtained by shooting with an exposure time longer than the exposure time of the first image, a third image in which noise in the first image has been reduced and a fourth image which is a synthesized image of the second and third images, then generates an output image by synthesizing the first and fourth images, and is provided with a synthesis ratio adjustment portion which adjusts, according to the noise level in the first image, at least one of a first synthesis ratio at which the second and third images are synthesized and a second synthesis ratio at which the first and fourth images are synthesized.

Specifically, for example, in the above-described third image sensing apparatus according to the invention, the first synthesis ratio is derived by applying the difference between the second and third images to a first predetermined conversion condition, and the second synthesis ratio is derived by applying the intensity of an edge contained in the first or third image to a second predetermined conversion condition; the synthesis ratio adjustment portion adjusts at least one of the first and second synthesis ratios according to the noise level in the first image by adjusting at least one of the first and second conversion conditions according to the noise level in the first image.

An image sensing apparatus according to the invention is provided with: an image sensing portion which acquires an image by shooting; and one of the image processing apparatuses described above. Here, the first and second images are acquired by the image sensing portion.

The significance and benefits of the invention will be clear from the following description of its embodiments. It should however be understood that these embodiments are merely examples of how the invention is implemented, and that the meanings of the terms used to describe the invention and its features are not limited to the specific ones in which they are used in the description of the embodiments.

BRIEF DESCRIPTION OF THE DRAWINGS

FIGS. 6A and 6B are diagrams illustrating block matching between a short-exposure image and a proper-exposure image;

DETAILED DESCRIPTION OF PREFERRED EMBODIMENTS

Hereinafter, embodiments of the present invention will be described specifically with reference to the accompanying drawings. Among the drawings referred to in the course, the same parts are identified by common reference signs, and in principle no overlapping description of the same parts will be repeated. Before the description of a first to a fifth examples, the features common to those examples, or referred to in the description of those examples, will be described first.

Figure 1:
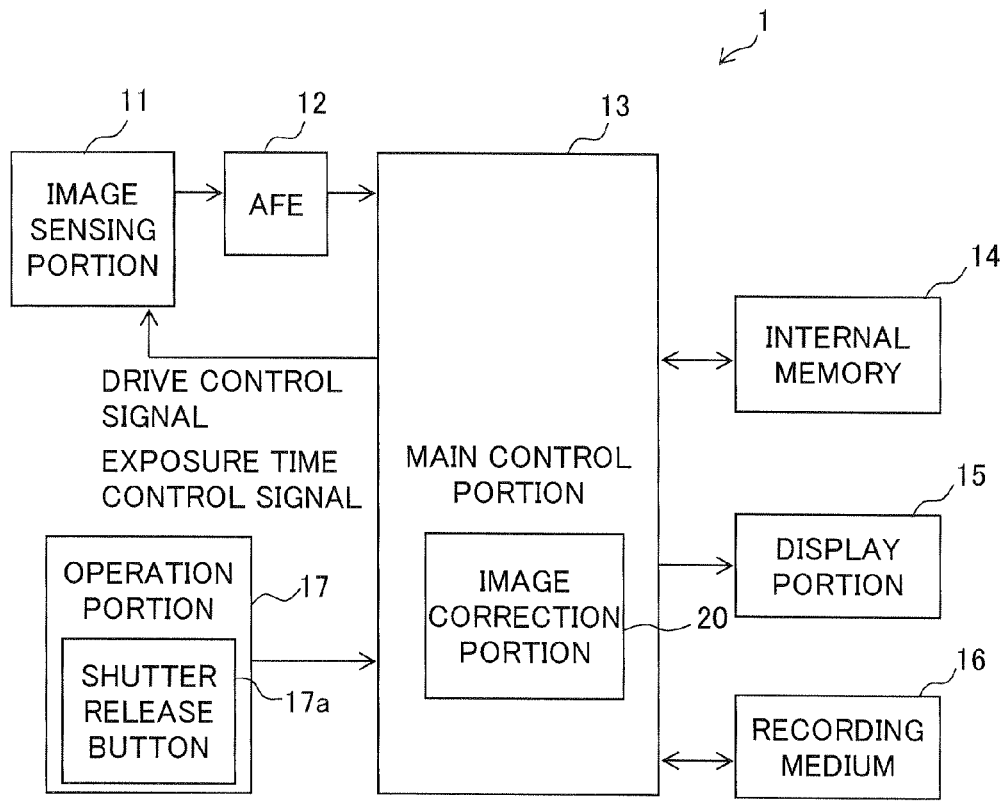
FIG. 1 is an overall block diagram of an image sensing apparatus embodying the invention.

FIG. 1 is an overall block diagram of an image sensing apparatus 1 embodying the invention. The image sensing apparatus 1 is, for example, a digital still camera capable of shooting and recording still images, or a digital video camera capable of shooting and recording still and moving images. It should be understood that (image) shooting is synonymous with image sensing.

The image sensing apparatus 1 is provided with an image sensing portion 11, an AFE (analog front end) 12, a main control portion 13, an internal memory 14, a display portion 15, a recording medium 16, and an operation portion 17. The main control portion 13 is provided with an image correction portion 20. The operation portion 17 is provided with a shutter release button 17a. Although this embodiment assumes that the display portion 15 is provided in the image sensing apparatus 1, the display portion 15 may instead be provided outside, or externally to, the image sensing apparatus 1.

Figure 2:
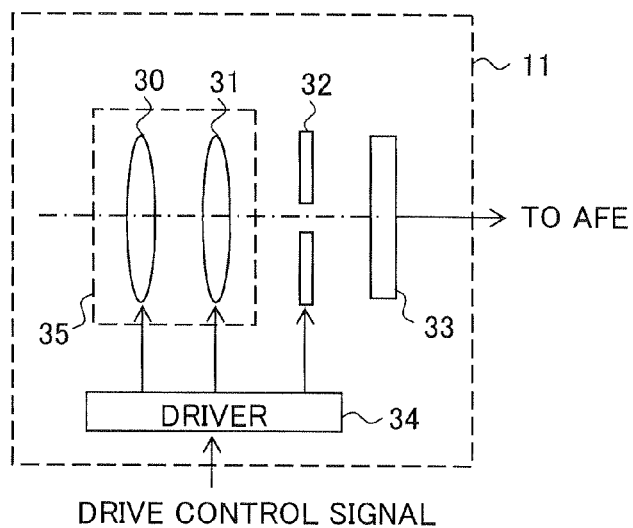
FIG. 2 is an internal configuration diagram of the image sensing portion in FIG. 1.

FIG. 2 is an internal configuration diagram of the image sensing portion 11. The image sensing portion 11 has an optical system 35, an aperture stop 32, an image sensor 33 comprising a CCD (charge-coupled device) or CMOS (complementary metal oxide semiconductor) image sensor or the like, and a driver 34 for driving and controlling the optical system 35 and the aperture stop 32. The optical system 35 is composed of a plurality of lenses including a zoom lens 30 and a focus lens 31. The zoom lens 30 and the focus lens 31 are movable along the optical axis. According to a drive control signal from the main control portion 13, the driver 34 drives and controls the positions of the zoom lens 30 and the focus lens 31 and the aperture size of the aperture stop 32, and thereby controls the focal length (angle of view) and focal position of the image sensing portion 11 and the amount of light incident on the image sensor 33.

The image sensor 33 photoelectrically converts the optical image—representing the subject—formed on it through the optical system 35 and the aperture stop 32, and outputs the electrical signal resulting from the photoelectric conversion to the AFE 12. More specifically, the image sensor 33 is provided with a plurality of light-receiving pixels arrayed two-dimensionally in a matrix formation. The light-receiving pixels each store an amount of signal charge commensurate with the exposure time (the length of the period for which they are exposed). The analog signals from the individual light-receiving pixels, having magnitudes proportional to the amounts of signal charge thus stored, are outputted to the AFE 12 sequentially in synchronism with drive pulses generated within the image sensing apparatus 1. In the following description, "exposure" refers to exposure of the image sensor 33.

The AFE 12 amplifies the analog signals outputted from the image sensing portion 11 (image sensor 33), and converts the amplified analog signals into digital signals. The AFE 12 outputs these digital signals sequentially to the main control portion 13.

The main control portion 13 is provided with a CPU (central processing unit), ROM (read-only memory), RAM (random-access memory), etc., and functions as a video signal processing portion. Based on the output signal of the AFE 12, the main control portion 13 generates a video signal that represents the image shot by the image sensing portion 11 (hereinafter also referred to as the "shot image"). The main control portion 13 also functions as a display control means for controlling what is displayed on the display portion 15, by controlling the display portion 15 in a way necessary to achieve display. The main control portion 13 also outputs to the image sensing portion 11 an exposure time control signal for controlling the exposure time of the image sensor 33. The function of the image correction portion 20 provided in the main control portion 13 will be described later.

The internal memory 14 is formed of SDRAM (synchronous dynamic random-access memory) or the like, and temporarily stores various kinds of data generated within the image sensing apparatus 1. The display portion 15 is a display device comprising a liquid crystal display panel or the like, and under the control of the main control portion 13 displays the shot image, or an image recorded on the recording medium 16, etc. The recording medium 16 is a non-volatile memory such as an SD (Secure Digital) memory card, and under the control of the main control portion 13 stores the shot image etc.

The operation portion 17 accepts operation from outside. How the operation portion 17 is operated is conveyed to the main control portion 13. The shutter release button 17a is a button for commanding shooting and recording of an image.

The shutter release button 17a is so formed that it can be pressed in two stages. When pressed lightly in by the camera operator (photographer, or movie shooter), the shutter release button 17a goes into a halfway pressed state; when pressed further in from that state, the shutter release button 17a goes into a fully pressed state.

The shot image may contain blur ascribable to camera shake. The image correction portion 20 is provided with a function of, instead of optically compensating for camera shake, generating an image containing less blur (blur-reduced image) through image processing using the image data carried by the output signal of the image sensing portion 11. The blur-reduced image to be generated by the image correction portion 20 will in the following description be referred to especially as the "correction aim image."

The correction aim age is generated based on a proper-exposure image and a short-exposure image. A proper-exposure image denotes an image obtained from the image sensor 33 by shooting with exposure lasting for a proper exposure time $T_{OP}$, and a short-exposure image denotes an image obtained from the image sensor 33 by shooting with exposure lasting for an exposure time $T_{SH}$ shorter than the $T_{OP}$.

The sensitivity at the time of acquisition of the short-exposure image is adjusted such that the lightness of the shot image is substantially the same between the short-exposure image and the proper-exposure image. Specifically, so that the lightness of the shot image may be substantially the same between the short-exposure image and the proper-exposure image, based on the ratio of the proper exposure time $T_{OP}$ and the exposure time $T_{SH}$, the sensitivity at the time of acquisition of the short-exposure image is made higher than the sensitivity at the time of acquisition of the proper-exposure image. The sensitivity here is, for example, the ISO sensitivity. The ISO sensitivity is the measure of sensitivity defined by ISO (International Organization for Standardization); adjusting the ISO sensitivity allows adjustment of the lightness (luminance level) of the shot image. In practice, according to the ISO sensitivity, the amplification factor of signal amplification in the AFE 12 is determined. The amplification factor is proportional to the ISO sensitivity. Doubling the ISO sensitivity doubles the amplification factor, resulting in doubling the luminance values (i.e., lightness) at the individual pixels of the shot image (here, however, saturation that may result from amplification is ignored). The luminance value of a pixel denotes the value of the luminance signal at that pixel.

Since the short-exposure image is shot with a comparatively short exposure time, it contains relatively little blur ascribable to camera shake or subject movement. Accordingly, the short-exposure image renders edges sharp. Since the sensitivity at the time of its shooting is high, however, the short-exposure image contains relatively much noise.

In contrast, since the proper-exposure image is shot with a comparatively long exposure time, it contains relatively little noise. Since its exposure time is long, however, the proper-exposure image tends to contain blur ascribable to camera shake or subject movement.

Figure 3A:
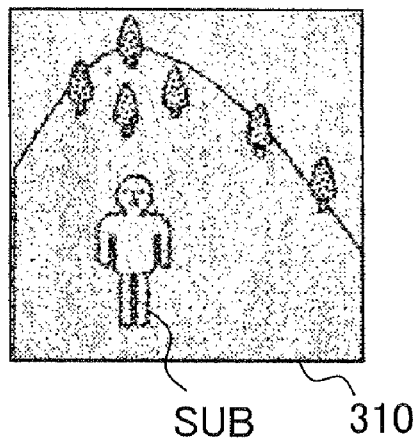
FIGS. 3A and 3B are diagrams showing examples of a short-exposure image and a proper-exposure image, respectively, shot by the image sensing apparatus of FIG. 1.
Figure 3B:
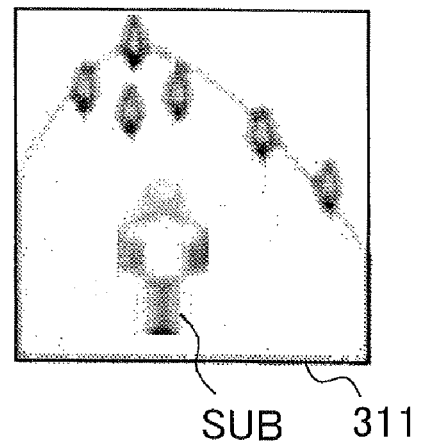

FIGS. 3A and 3B show examples of the short- and proper-exposure images. The images 310 and 311 are examples of the short- and proper-exposure images respectively. The short-exposure image 310 and the proper-exposure image 311 are obtained by shooting a person SUB, as a subject of interest, standing against the background of a mountain, as a background subject.

Compared with the proper-exposure image 311, the short-exposure image 310 renders edges sharp but contains relatively much noise (corresponding to black spots in FIG. 3A). On the other hand, compared with the short-exposure image 310, the proper-exposure image 311 contains little noise but shows the person SUB greatly blurred. Moreover, FIGS. 3A and 3B assume that, during shooting of the short- and proper-exposure images 310 and 311, the person SUB moves. As a result, relative to the position of the person SUB on the short-exposure image 310, the person SUB on the proper-exposure image 311 is located to the right, and in addition the person SUB on the proper-exposure image 311 is blurred due to subject movement.

Figure 4:
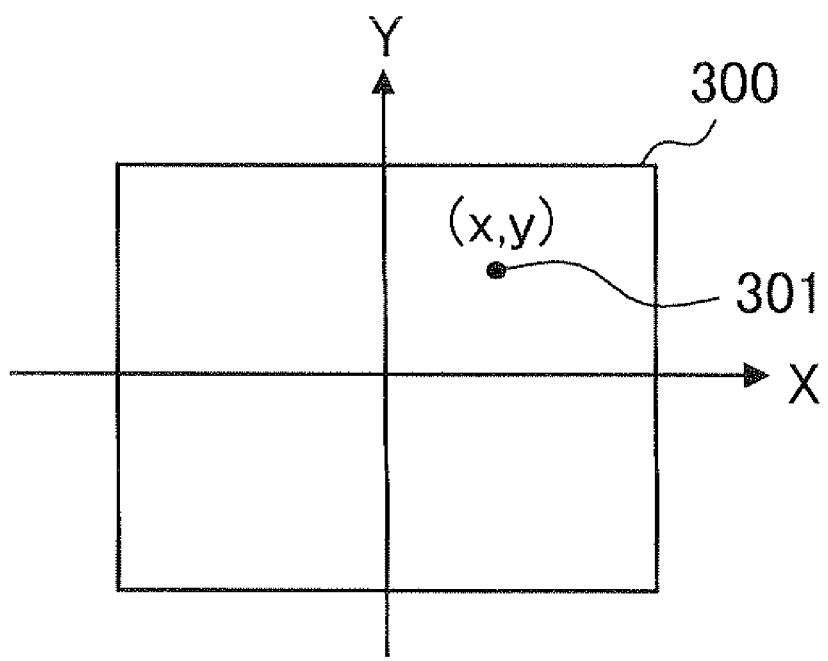
FIG. 4 is a diagram showing a two-dimensional coordinate system in a spatial domain along with a two-dimensional image.

As shown in FIG. 4, in a spatial domain, a two-dimensional coordinate system XY is defined on which to map any two-dimensional image 300 for the sake of consideration. The image 300 may be, for example, the proper-exposure image, the short-exposure image, the correction aim image, or any of a first to a third intermediary image, which will be described later. The X- and Y-axes are aligned with the horizontal and vertical directions, respectively, of the two-dimensional image 300. The two-dimensional image 300 is formed of a plurality of pixels arrayed in both the horizontal and vertical directions in a matrix formation, and the position of a given pixel 301 on the two-dimensional image 300 is represented by (x, y). In the present specification, the position of a pixel is also referred to simply as a pixel position. The symbols x and y represent the coordinates of the pixel 301 in the X- and Y-axis directions respectively. On the two-dimensional coordinate system XY, a rightward shift by one pixel in the position of a given pixel results in an increase by one in its coordinate in the X-axis direction, and an upward shift by one pixel in the position of a given pixel results in an increase by one in its coordinate in the Y-axis direction. Accordingly, when the position of the pixel 301 is (x, y), the positions of the pixels adjacent to it on the right, on the left, above, and below are represented by (x+1, y), (x−1, y), (x, y+1), and (x, y−1) respectively.

Below will be presented a first to a fifth examples (Examples 1 to 5) of the invention as examples for illustrating the configuration and operation of the image sensing apparatus 1 (and in particular the image correction portion 20). Unless inconsistent, any feature described with regard to one example is applicable to any other example. Since Example 1 includes those technologies that form the basis for the technologies used in Examples 2 to 5, any feature described with regard to Example 1 in particular is, unless inconsistent, applicable to Examples 2 to 5.

EXAMPLE 1

First, Example 1 of the invention will be described. In Example 1, as the shutter release button 17a is pressed, a short-exposure image and a proper-exposure image are acquired in the following manner.

When the shutter release button 17a is recognized to be in the halfway pressed state, the main control portion 13 performs pre-exposure, and determines the proper exposure time $T_{OP}$ based on the level of the output signal of the AFE 12 resulting from the pre-exposure. Pre-exposure denotes exposure performed prior to exposure for a short-exposure image and a proper-exposure image. When thereafter the shutter release button 17a is recognized to be in the fully pressed state, a short-exposure image and a proper-exposure image are shot consecutively. The short- and proper-exposure images may be shot the former first and the latter next, or the latter first and the former next. In either case, the two images are shot consecutively with as short an interval as possible between their exposure. As described previously, the proper-exposure image is shot with a proper exposure time $T_{OP}$, and the short-exposure image is shot with an exposure time $T_{SH}$ shorter than the proper exposure time $T_{OP}$. For example, the exposure time $T_{SH}$ is set equal to or shorter than the camera shake limit exposure time, which corresponds to the reciprocal of the focal length of the optical system 35. $T_{SH}$ may be set at, for example, $T_{OP}/4$.

Figure 5:
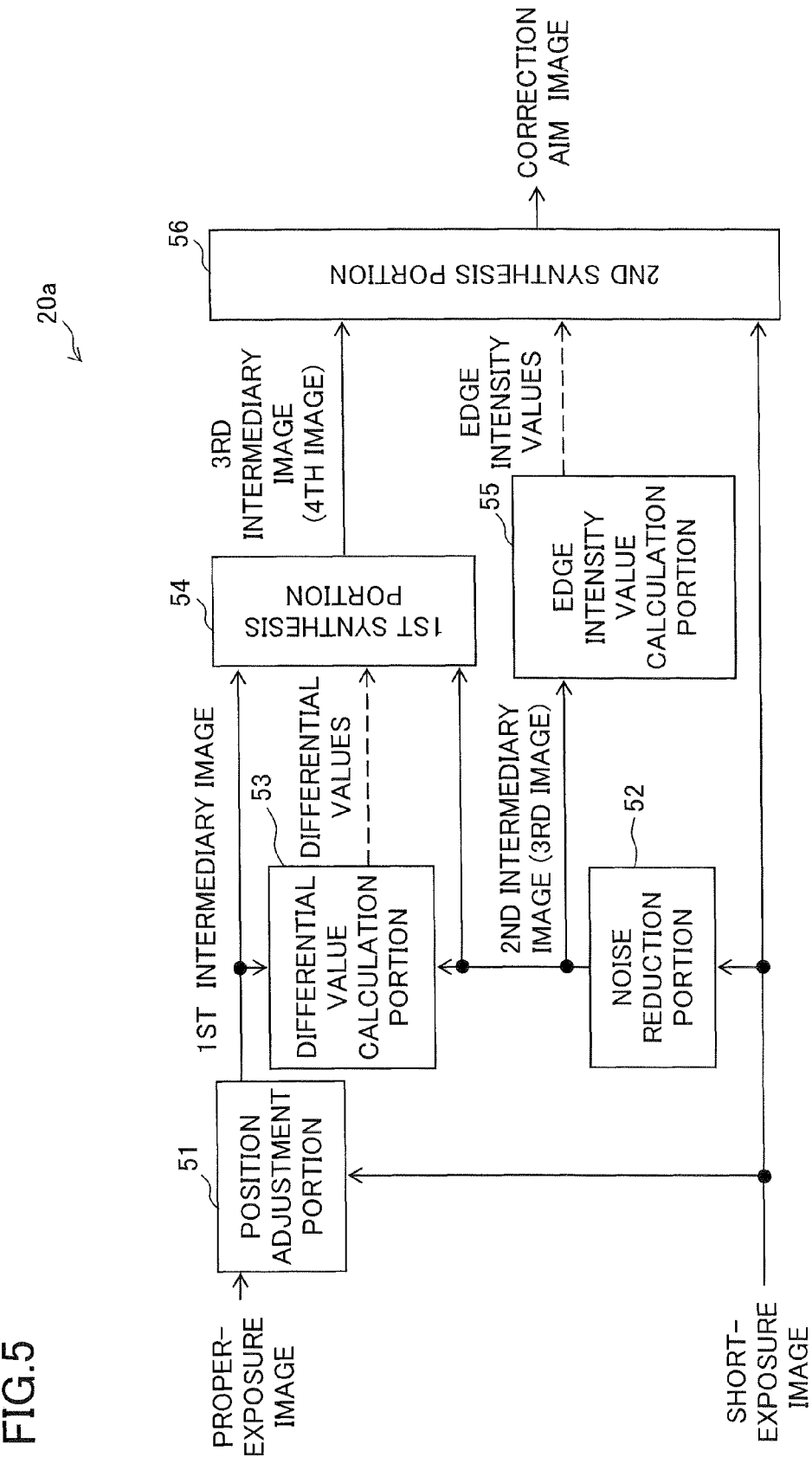
FIG. 5 is an internal block diagram of an image correction portion according to Example 1 of the invention.

FIG. 5 is an internal block diagram of an image correction portion 20a according to Example 1. In Example 1, the image correction portion 20a is used as the image correction portion 20 in FIG. 1. The image data of the short- and proper-exposure images shot as described above is fed to the image correction portion 20a. Image data denotes data representing the color and luminance of an image.

The image correction portion 20a is provided with the following blocks: a position adjustment portion 51 that detects the displacement (difference in position) between the short- and proper-exposure images and performs position adjustment between the two image; a noise reduction portion 52 that reduces noise contained in the short-exposure image; a differential value calculation portion 53 that finds the differential between the position-adjusted proper-exposure image and the noise-reduced short-exposure image to calculate the differential values at individual pixel positions; a first synthesis portion 54 that synthesizes the position-adjusted proper-exposure image and the noise-reduced short-exposure image at a synthesis ratio based on the differential value; an edge intensity value calculation portion 55 that extracts edges from the noise-reduced short-exposure image to calculate an edge intensity value; and a second synthesis portion 56 that synthesizes the short-exposure image and the image synthesized by the first synthesis portion 54 at a synthesis ratio based on the edge intensity value to generate a correction aim image.

The operation of the individual blocks in the image correction portion 20a will now be described in detail. It should be understood that what is referred to simply as the short-exposure image is the short-exposure image as it has undergone no noise reduction processing by the noise reduction portion 52 or by any other noise reduction portion (such as 57), and this applies also in the other examples described later. The example of the short-exposure image 310 shown in FIG. 3A is one that has undergone no noise reduction by the noise reduction portion 52.

Based on the image data of the short- and proper-exposure images, the position adjustment portion 51 detects the displacement between them, and based on the detected displacement performs position adjustment between the short- and proper-exposure images. Since the short- and proper-exposure images are shot consecutively as described above, the shooting regions is substantially the same between shooting of the two images, but since the shooting time is not completely the same between shooting of the two images, the shooting region slightly differs between the two images. Consequently, the position at which the image data of the same subject exists may slightly differ between on the short-exposure image and on the proper-exposure image.

The position adjustment portion 51 detects that displacement, and applies coordinate conversion to the coordinates of the individual pixels of the proper-exposure image in such a way as to cancel the detected displacement. This, if errors are ignored, makes the position at which the image data of the same subject exists completely coincident between on the short-exposure image and on the proper-exposure image after coordinate conversion.

For displacement detection, the position adjustment portion 51 may adopt any method that permits detection of a displacement between two images based on the image data of the two images. For example, displacement detection can be achieved by a representative point matching method, a block matching method, or a gradient method. As an example, how a displacement is detected in a case where a block matching method is used will be described below with reference to FIGS. 6A and 6B.

In FIG. 6A, the reference sign 350 indicates the short-exposure image, and the reference sign 351 indicates a block of interest that is set within the short-exposure image 350. The block of interest 351 is part of the entire image region (the image region of the whole) of the short-exposure image 350. In FIG. 6B, the reference sign 360 indicates the proper-exposure image, and the reference sign 361 indicates a candidate block set within the proper-exposure image 360. The candidate block 361 is part of the entire image region of the proper-exposure image 360. The block of interest 351 and the candidate block 361 have the same image size (are formed of the same number of pixels). In FIG. 6B, the area 362 within the broken-line rectangular region is a search area within which the candidate block 361 can be located. The search area 362 is, for example, a rectangular area with its center at the center position of the block of interest 351.

The position adjustment portion 51 calculates the correlation value between the image within the block of interest 351 and the image within the candidate block 361. Meanwhile, the candidate block 361 is moved, one pixel at a time, in the horizontal or vertical direction within the search area 362, and every time it is so moved, the correlation value is calculated. Taken as the correlation value is, for example, the sum of the absolute values of differences in luminance between corresponding pixels of the block of interest 351 and the candidate block 361. Specifically, for example, of all the pixels within the block of interest 351, one after another is taken as a pixel of interest; for each such pixel of interest, the absolute value of the difference between the luminance value of the pixel of interest within the block of interest 351 and the luminance value of the pixel corresponding to the pixel of interest within the candidate block 361 is found; then the sum of the absolute values so found (of which the number equals the number of pixels in the block of interest 351) is calculated as the correlation value. This correlation value calculated as a sum is generally called a SAD (sum of absolute differences). Instead of a SAD, which is the sum of the absolute values of luminance differences, a SSD (sum of squared differences), which is the sum of the squares of luminance differences may be found as the correlation value.

The correlation value indicates the similarity between the image within the block of interest 351 and the image within the candidate block 361; the higher the similarity between the images, the smaller the corresponding correlation value. The position adjustment portion 51 identifies the center position of the candidate block 361 at which the correlation value is the smallest, and finds, as a movement vector, the vector directed from the center position of the block of interest 351 to the center position of the candidate block 361. The direction and magnitude of this movement vector represent the direction and magnitude of the displacement of the proper-exposure image relative to the short-exposure image.

Based on the displacement (movement vector) thus found, the position adjustment portion 51 applies the above-mentioned coordinate conversion to the proper-exposure image to correct the displacement. The resulting displacement-corrected proper-exposure image (in other words, position-adjusted proper-exposure image) is called the first intermediary image. The above-discussed displacement (movement vector) may instead be detected by use of a camera shake detection sensor that detects the movement of the body of the image sensing apparatus 1 (e.g., an angular velocity sensor that detects the angular velocity of the body of the image sensing apparatus 1).

The noise reduction portion 52 applies noise reduction processing to the short-exposure image, and thereby reduces noise contained in the short-exposure image. The noise reduction processing in the noise reduction portion 52 can be achieved by any spatial domain filtering fit for noise reduction. In the spatial domain filtering in the noise reduction portion 52, it is preferable to adopt a spatial domain filter that retains edges as much as possible, and accordingly, for example, spatial domain filtering using a median filter is adopted.

The noise reduction processing in the noise reduction portion 52 may instead be achieved by any frequency domain filtering fit for noise reduction. In a case where frequency domain filtering is adopted in the noise reduction portion 52, it is preferable to use a low-pass filter that, of different spatial frequency components contained in the short-exposure image, passes those lower than a predetermined cut-off frequency and attenuates those equal to or higher than the cut-off frequency. Also through spatial domain filtering using a median filter or the like, it is possible, of different spatial frequency components contained in the short-exposure image, to retain those of relatively low frequencies almost intact and attenuate those of relatively high frequencies. Thus, spatial domain filtering using a median filter or the like can be thought of as a kind of filtering using a low-pass filter.

Figure 7:
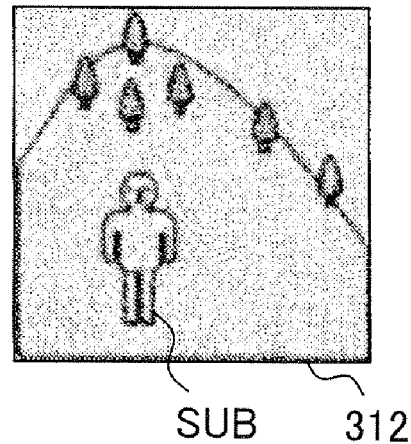
FIG. 7 is a diagram showing a second intermediary image obtained by reducing noise in the short-exposure image in FIG. 3A.

The short-exposure image having undergone the noise reduction by the noise reduction portion 52 functions as a second intermediary image (third image). FIG. 7 shows the second intermediary image 312 obtained by applying noise reduction processing to the short-exposure image 310 in FIG. 3A. As will be clear from a comparison between FIG. 3A and FIG. 7, in the second intermediary image 312, the noise contained in the short-exposure image 310 is reduced, while edges are slightly less sharp than in the short-exposure image 310.

The differential value calculation portion 53 calculates the differential values at individual pixel positions between the first and second intermediary images. The differential value at pixel position (x, y) is represented by DIF(x, y). The differential value DIF(x, y) represents the difference in luminance and/or color between the pixel at pixel position (x, y) on the first intermediary image and the pixel at pixel position (x, y) on the second intermediary image.

The differential value calculation portion 53 calculates the differential value DIF(x, y), for example, according to formula (1) below. Here, $P1_Y(x, y)$ represents the luminance value of the pixel at pixel position (x, y) on the first intermediary image, and $P2_Y(x, y)$ represents the luminance value of the pixel at pixel position (x, y) on the second intermediary image.

$$DIF(x,y)=|P1_Y(x,y)-P2_Y(x,y)| \quad (1)$$

The differential value DIF(x, y) may be calculated, instead of according to formula (1), according to formula (2) or (3) below by use of signal values in an RGB format. Here, $P1_R(x, y)$, $P1_G(x, y)$, and $P1_B(x, y)$ represent the values of the R, G, and B signals, respectively, of the pixel at pixel position (x, y) on the first intermediary image, and $P2_R(x, y)$, $P2_G(x, y)$, and $P2_B(x, y)$ represent the values of the R, G, and B signals, respectively, of the pixel at pixel position (x, y) on the second intermediary image. The R, G, and B signals of a given pixel are the color signals that represent the intensity of red, green, and blue, respectively, at that pixel.

$$DIF(x,y)=|P1_R(x,y)-P2_R(x,y)|+|P1_G(x,y)-P2_G(x,y)|+ |P1_B(x,y)-P2_B(x,y)| \quad (2)$$

$$DIF(x,y)=[|\{P1_R(x,y)-P2_R(x,y)\}^2+\{P1_G(x,y)-P2_G(x,y)\}^2+ \{P1_B(x,y)-P2_B(x,y)\}^2|]^{1/2} \quad (3)$$

The above-described method of calculating the differential value DIF(x, y) according to formula (1), (2), or (3) is merely an example; that is, the differential value DIF(x, y) may be found by any other method. The differential value DIF(x, y) may be calculated, for example, by use of signal values in a YUV format by a method similar to that using signal values in an RGB format. In that case, R, G, and B in formulae (2) and (3) are read as Y, U, and V respectively. Signals in a YUV format consist of a luminance signal identified by Y and color-difference signals identified by U and V.

Figure 8:
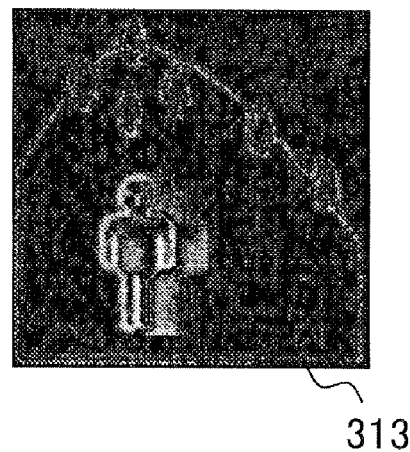
FIG. 8 is a diagram showing a differential image between a position-adjusted proper-exposure image (first intermediary image) and a noise-reduced short-exposure image (second intermediary image)

FIG. 8 shows an example of a differential image that has as its pixel signal values the differential values DIF(x, y) at individual pixel positions. The differential image 313 in FIG. 8 are based on the short- and proper-exposure images 310 and 311 in FIGS. 3A and 3B. In the differential image 313, parts where the differential value DIF(x, y) is relatively large appear white, and parts where the differential value DIF(x, y) is relatively small appear black. Due to movement of the person SUB during shooting of the short- and proper-exposure images 310 and 311, the differential value DIF(x, y) is relatively large in the person SUB's movement region on the differential image 313. Moreover, due to blur on the proper-exposure image 311 ascribable to camera shake, the differential value DIF(x, y) is large also near edges (the outlines of the person and the mountain).

The first synthesis portion 54 synthesizes the first and second intermediary images, and outputs the resulting synthesized image as a third intermediary image (fourth image). The synthesis here is achieved by performing weighted addition on the pixel signals of corresponding pixels between the first and second intermediary images. Through weighted addition, pixel signals are mixed between corresponding pixels, and here the mix ratio (in other words, the synthesis ratio) can be determined based on the differential value DIF(x, y). The mix ratio with respect to pixel position (x, y) as determined by the first synthesis portion 54 is represented by α(x, y).

Figure 9:
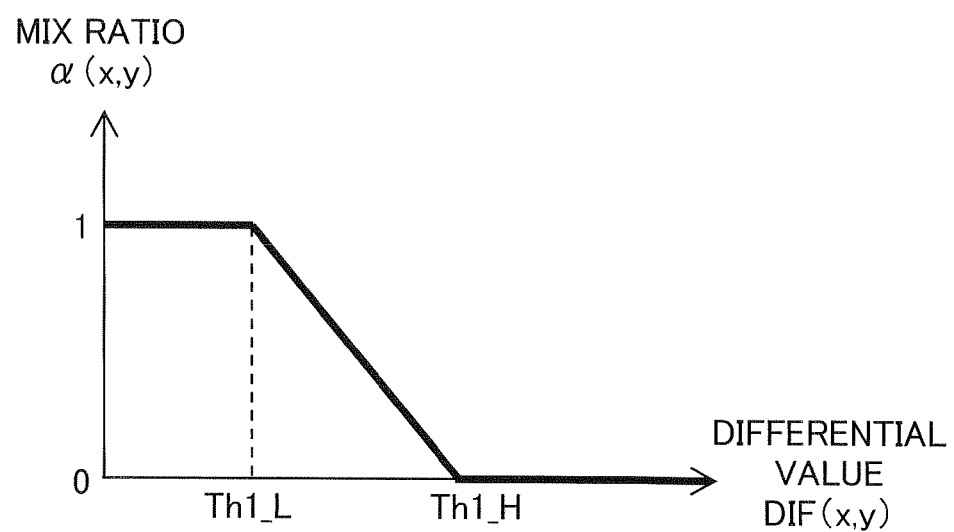
FIG. 9 is a diagram showing a relationship between a differential value obtained in the differential value calculation portion in FIG. 5 and a mix ratio at which pixel signals of the first and second intermediary images are mixed.

An example of the relationship between the differential value DIF(x, y) and the mix ratio α(x, y) is shown in FIG. 9. In a case where the example of the relationship in FIG. 9 is adopted, when "DIF(x, y)<Th1_L" holds, "α(x, y)=1";
when "Th1_L≦DIF(x, y)<Th1_H" holds, "α(x, y)=1− (DIF(x, y)−Th1_L)/(Th1_H−Th1_L)"; and
when "Th1_H≦DIF(x, y)" holds, "α(x, y)=0."

Here, Th1_L and Th1_H are predetermined threshold values that fulfill "0<Th1_L<Th1_H." In a case where the example of the relationship in FIG. 9 is adopted, as the differential value DIF(x, y) increases from the threshold value Th1_L to the threshold value Th1_H, the corresponding mix ratio α(x, y) linearly decreases from 1 to 0. The mix ratio α(x, y) may instead be made to decrease non-linearly.

The first synthesis portion 54 determines, from the differential values DIF(x, y) at individual pixel positions, the mix ratios α(x, y) at those pixel positions, and then mixes the pixel signals of corresponding pixels between the first and second intermediary images according to formula (4) below to generate the pixel signals of the third intermediary image. Here, P1(x, y), P2(x, y), and P3(x, y) represent the pixel signals at pixel position (x, y) on the first, second, and third intermediary images respectively.

$$P3(x,y)=\alpha(x,y)\times P1(x,y)+\{1-\alpha(x,y)\}\times P2(x,y) \quad (4)$$

The pixel signals P1(x, y), P2(x, y), and P3(x, y) represent the luminance and color of the pixel at pixel position (x, y) on the first, second, and third intermediary images respectively, and represent them, for example, in an RGB or YUV format. For example, in a case where the pixel signals P1(x, y) etc. each consist of R, G, and B signals, for each of the R, G, and B signals, the pixel signals P1(x, y) and P2(x, y) are mixed to generate the pixel signal P3(x, y). A case where the pixel signals P1(x, y) etc. each consist of Y, U, and V signals can be dealt with by similar processing.

Figure 10:
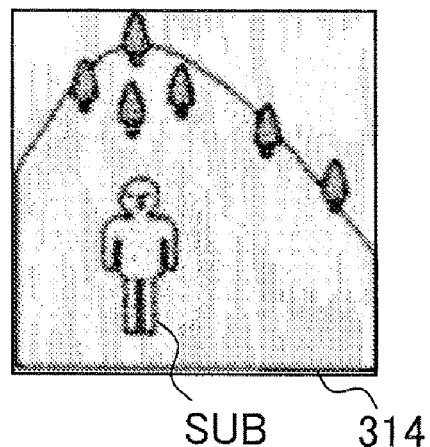
FIG. 10 is a diagram showing a third intermediary image obtained by synthesizing a position-adjusted proper-exposure image (first intermediary image) and a noise-reduced short-exposure image (second intermediary image)

FIG. 10 shows an example of the third intermediary image obtained in the first synthesis portion 54. The third intermediary image 314 shown in FIG. 10 is based on the short- and proper-exposure images 310 and 311 shown in FIGS. 3A and 3B.

As described above, in the region in which the person SUB moved, the differential value DIF(x, y) is relatively large, and accordingly the degree of contribution (1−α(x, y)) of the second intermediary image 312 (see FIG. 7) to the third intermediary image 314 is relatively high. Consequently, the blur in the third intermediary image 314 ascribable to subject movement is greatly reduced compared with that in the proper-exposure image 311 (see FIG. 3B). The differential value DIF(x, y) is large also near edges, and accordingly the just-mentioned degree of contribution (1−α(x, y)) is high also there. Consequently, the sharpness of edges in the third intermediary image 314 is improved compared with that in the proper-exposure image 311. Since, however, edges in the second intermediary image 312 are slightly less sharp than those in the short-exposure image 310, edges in the third intermediary image 314 also are slightly less sharp than those in the short-exposure image 310.

On the other hand, a region where the differential value DIF(x, y) is relatively small is supposed to be a flat region containing a small edge component. Accordingly, for a region with a relatively small differential value DIF(x, y), as described above, the degree of contribution α(x, y) of the first intermediary image, which contains little noise, is made comparatively high. This helps suppress noise in the third intermediary image low. It should be noted that, since the second intermediary image is generated through noise reduction processing, noise is hardly visible even in a region where the degree of contribution (1−α(x, y)) of the second intermediary image to the third intermediary image is relatively high.

As described above, edges in the third intermediary image are slightly less sharp than those in the short-exposure image. This unsharpness is improved by the edge intensity value calculation portion 55 and the second synthesis portion 56.

The edge intensity value calculation portion 55 performs edge extraction processing on the second intermediary image to calculate the edge intensity values at individual pixel positions. The edge intensity value at pixel position (x, y) is represented by E(x, y). The edge intensity value E(x, y) indicates the amount of variation among the pixel signals within a small block centered around pixel position (x, y) on the second intermediary image; the larger the amount of variation, the larger the edge intensity value E(x, y).

For example, the edge intensity value E(x, y) is found according to formula (5) below. As described above, P2$_Y$(x, y) represents the luminance value of the pixel at pixel position (x, y) on the second intermediary image. Fx(i, j) and Fy(i, j) represent the filter coefficients of the edge extraction filter for extracting edges in the horizontal and vertical directions respectively. Usable as the edge extraction filter is any spatial domain filter fit for edge extraction, of which examples include a differentiating filter, a Prewitt filter, and a Sobel filter.

$$E(x, y) = \left| \sum_{i=-1}^{1} \sum_{j=-1}^{1} Fx(i, j) \cdot P2_Y(x+i, y+j) \right| + \left| \sum_{i=-1}^{1} \sum_{j=-1}^{1} Fy(i, j) \cdot P2_Y(x+i, y+j) \right| \quad (5)$$

For example, in a case where a Prewitt filter is used, Fx(i, j) in formula (5) is substituted by "Fx(−1, −1)=Fx(−1, 0)= Fx(−1, 1)=−1", "Fx(0, −1)=Fx(0, 0)=Fx(0, 1)=0," and "Fx(1, −1)=Fx(1, 0)=Fx(1, 1)=1," and Fy(i, j) in formula (5) is substituted by "Fy(−1, −1)=Fy(0, −1)=Fy(1, −1)=−1", "Fy(−1, 0)=Fy(0, 0)=Fy(1, 0)=0," and "Fy(−1, 1)=Fy(0, 1)=Fy(1, 1)=1." Needless to say, these filter coefficients are merely examples, and the edge extraction filter for calculating the edge intensity value E(x, y) can be modified in many ways. Although formula (5) uses an edge extraction filter with a filter size of 3×3, the edge extraction filter may have any filter size other than 3×3.

Figure 11:
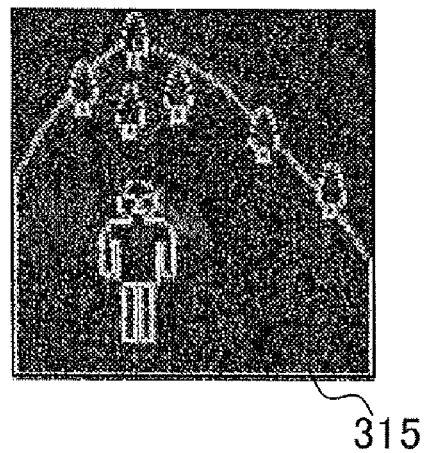
FIG. 11 is a diagram showing an edge image obtained by applying edge extraction processing to a noise-reduced short-exposure image (second intermediary image)

FIG. 11 shows an example of an edge image that has as its pixel signal values the edge intensity values E(x, y) at individual pixel positions. The edge image 315 in FIG. 11 is based on the short- and proper-exposure images 310 and 311 in FIGS. 3A and 3B. In the edge image 315, parts where the edge intensity value E(x, y) is relatively large appear white, and parts where the edge intensity value E(x, y) is relatively small appear black. The edge intensity value E(x, y) is obtained by extracting edges from the second intermediary image 312, which is obtained by reducing noise in the short-exposure image 310, which contains sharp edges. Thus, edges are separated from noise, and with a clear distinction made between edges in the subject and noise, the edge intensity value E(x, y) identifies the position of edges.

The second synthesis portion 56 synthesizes the third intermediary image and the short-exposure image, and outputs the resulting synthesized image as the correction aim image. The synthesis here is achieved by performing weighted addition on the pixel signals of corresponding pixels between the third intermediary image and the short-exposure image. Through weighted addition, pixel signals are mixed between corresponding pixels, and here the mix ratio (in other words, the synthesis ratio) can be determined based on the edge intensity value E(x, y). The mix ratio with respect to pixel position (x, y) as determined by the second synthesis portion 56 is represented by β(x, y).

Figure 12:
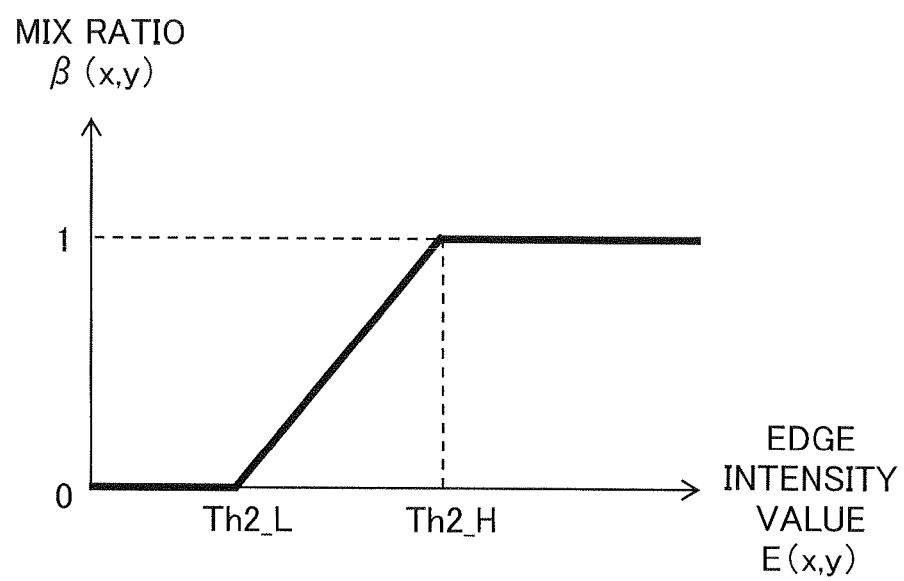
FIG. 12 is a diagram showing a relationship between an edge intensity value obtained in the edge intensity value calculation portion in FIG. 5 and a mix ratio at which pixel signals of the short-exposure image and the third intermediary image are mixed.

An example of the relationship between the edge intensity value E(x, y) and the mix ratio β(x, y) is shown in FIG. 12. In a case where the example of the relationship in FIG. 12 is adopted, when "E(x, y)<Th2_L" holds, "β(x, y)=0";
when "Th2_L≦E(x, y)<Th2_H" holds, "β(x, y)=(E(x, y)−Th2_L)/(Th2_H−Th2_L)"; and
when "Th2_H≦E(x, y)" holds, "β(x, y)=1."

Here, Th2_L and Th2_H are predetermined threshold values that fulfill "0<Th2_L<Th2_H." In a case where the example of the relationship in FIG. 12 is adopted, as the edge intensity value E(x, y) increases from the threshold value Th2_L to the threshold value Th2_H, the corresponding mix ratio β(x, y) linearly increases from 0 to 1. The mix ratio β(x, y) may instead be made to increase non-linearly.

The second synthesis portion 56 determines, from the edge intensity values E(x, y) at individual pixel positions, the mix ratios β(x, y) at those pixel positions, and then mixes the pixel signals of corresponding pixels between the third intermediary image and the short-exposure image according to formula (6) below to generate the pixel signals of the correction aim image. Here, P$_{OUT}$(x, y), P$_{IN\_SH}$(x, y), and P3(x, y) represent the pixel signals at pixel position (x, y) on the correction aim image, the short-exposure image, and the third intermediary image respectively.

$$P_{OUT}(x,y)=β(x,y)×P_{IN\_SH}(x,y)+\{1-β(x,y)\}×P3(x,y) \quad (6)$$

The pixel signals P$_{OUT}$(x, y), and P3(x, y) represent the luminance and color of the pixel at pixel position (x, y) on the correction aim image, the short-exposure image, and the third intermediary image respectively, and represent them, for example, in an RGB or YUV format. For example, in a case where the pixel signals P3(x, y) etc. each consist of R, G, and B signals, for each of the R, G, and B signals, the pixel signals P$_{IN\_SH}$ (x, y) and P3(x, y) are mixed to generate the pixel signal P$_{OUT}$(x, y). A case where the pixel signals P3(x, y) etc. each consist of Y, U, and V signals can be dealt with by similar processing.

Figure 13:
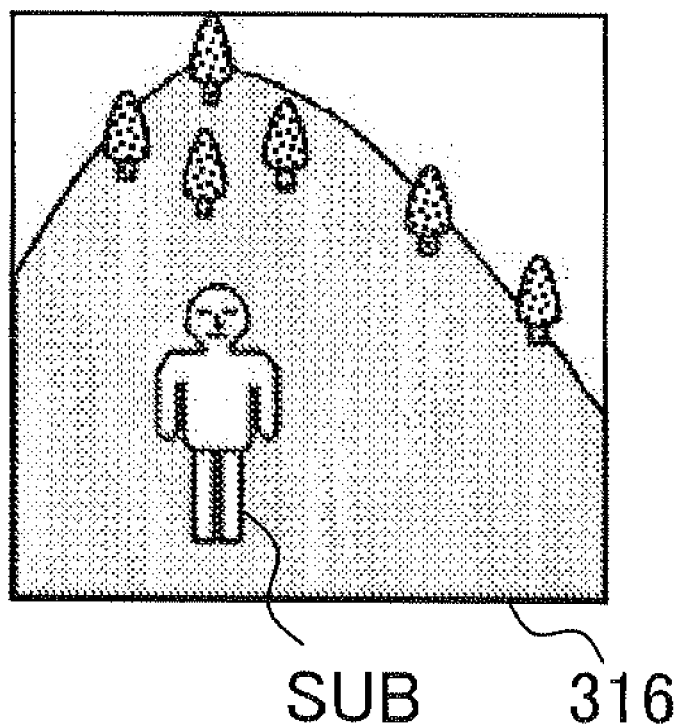
FIG. 13 is a diagram showing a correction aim image obtained by synthesizing a short-exposure image and a third intermediary image.

FIG. 13 shows an example of the correction aim image obtained in the second synthesis portion 56. The correction aim image 316 shown in FIG. 13 is based on the short- and proper-exposure images 310 and 311 shown in FIGS. 3A and 3B. In edge parts, the degree of contribution β(x, y) of the short-exposure image 310 to the correction aim image 316 is high; thus, in the correction aim image 316, the slight unsharpness of edges in the third intermediary image 314 (see FIG. 10) is improved, and edges are rendered sharp. On the other hand, in non-edge parts (flat parts), the degree of contribution (1−β(x, y)) of the third intermediary image 314 to the correction aim image 316 is high; thus, in the correction aim image 316, less of the noise contained in the short-exposure image 310 is reflected. Noise is particularly visible in non-edge parts (flat parts), adjusting the synthesis ratio in terms of the mix ratio β(x, y) as described above is effective.

As described above, according to Example 1, by synthesizing the proper-exposure image (more precisely, the position-adjusted proper-exposure image (i.e., the first intermediary image)) and the noise-reduced short-exposure image (i.e., the second intermediary image) by use of the differential values obtained from them, it is possible to generate the third intermediary image in which blur in the proper-exposure image and noise in the short-exposure image have been reduced. Thereafter, by synthesizing, by use of the edge intensity values obtained from the noise-reduced short-exposure image (i.e., the second intermediary image), the third intermediary image and the short-exposure image, it is possible to make the correction aim image reflect sharp edges in the short-exposure image and simultaneously make the correction aim image reflect less of the noise in the short-exposure image. Thus, the correction aim image contains little blur and little noise.

To detect edges and noise in a clearly separated fashion, and to satisfactorily avoid noise in the short-exposure image mixing into the correction aim image, it is preferable to derive the edge intensity value from the noise-reduced short-exposure image (i.e., the second intermediary image), but it is also possible to derive the edge intensity value from the short-exposure image before noise reduction (e.g., from the short-exposure image 310 in FIG. 3A). In that case, $P2_Y(x, y)$ in formula (5) is first substituted by the luminance value of the pixel at pixel position (x, y) on the short-exposure image before noise reduction, and then the edge intensity value $E(x, y)$ is calculated according to formula (5).

Figure 14:
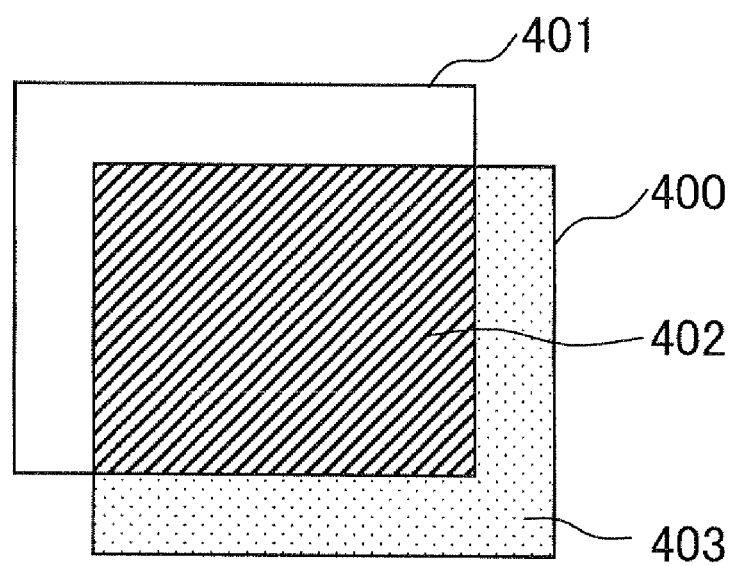
FIG. 14 is a diagram showing a positional relationship between the image regions of a short-exposure image and a proper-exposure image, both position-adjusted.

In reality, between the image region of the short-exposure image and the image region of the position-adjusted proper-exposure image, there exists an image region where they do not overlap (it has been ignored in the description above for the sake of simplicity). Specifically, as shown in FIG. 14, generally, the position of the entire image region 400 of the short-exposure image does not completely coincide with the position of the entire image region 401 of the position-adjusted proper-exposure image, and the region 402 (hereinafter referred to as the overlap region 402) over which the entire image regions 400 and 401 overlap is smaller in size than either of the entire image regions 400 and 401. In FIG. 14, the overlap region 402 appears as a hatched region.

The noise reduction portion 52, the differential value calculation portion 53, the first synthesis portion 54, the edge intensity value calculation portion 55, and the second synthesis portion 56 can, based on the pixel signals within the overlap region 402 on the short-exposure image and the pixel signals within the overlap region 402 on the first intermediary image, generate the correction aim age such that it has as its entire image region the overlap region 402. In this case, the entire image region of the correction aim image is smaller in size than that of the short-exposure image.

Instead, it is possible to generate the pixel signals within the non-overlap region 403 on the correction aim image from the pixel signals within the non-overlap region 403 on the second intermediary image (e.g., the former pixel signals are made identical with the latter pixel signals). It is also possible to generate the pixel signals within the overlap region 402 on the correction aim image based on the pixel signals within the overlap region 402 on the short-exposure image and the pixel signals within the overlap region 402 on the first intermediary image, and then fit together the overlap region 402 and the non-overlap region 403 on the correction aim image to form the entire image region of the correction aim image. In this case, the entire image region of the correction aim age is the same in size as that of the short-exposure image. Here, the non-overlap region 403 denotes the region that remains when the overlap region 402 is excluded from the entire image region 400 of the short-exposure image, and in FIG. 14 appears as a dotted region.

Example 2

Next, Example 2 of the invention will be described. The noise reduction processing performed by the noise reduction portion 52 in FIG. 5 has a noise reduction characteristic that depends on the characteristic of the filtering used for the noise reduction processing, and that noise reduction characteristic is constant irrespective of the noise level in the short-exposure image. Thus, when the short-exposure image contains too much noise, the noise may not be reduced satisfactorily. If comparatively much noise remains in the second intermediary image (third image) outputted from the noise reduction portion 52, it may hamper proper calculation of the mix ratios $\alpha(x, y)$ and $\beta(x, y)$, possibly making it impossible the obtain a satisfactory correction aim image. If, however, an attempt is made to avoid that by excessively increasing the intensity of the noise reduction processing by the noise reduction portion 52, when the short-exposure image does not contain much noise, edges in the short-exposure image are degraded more than necessary. This is because noise reduction processing also has a smoothing effect.

In view of the above, in Example 2, the contents of the noise reduction processing for generating the second intermediary image from the short-exposure image are adjusted according to the noise level in the short-exposure image.

Figure 15:
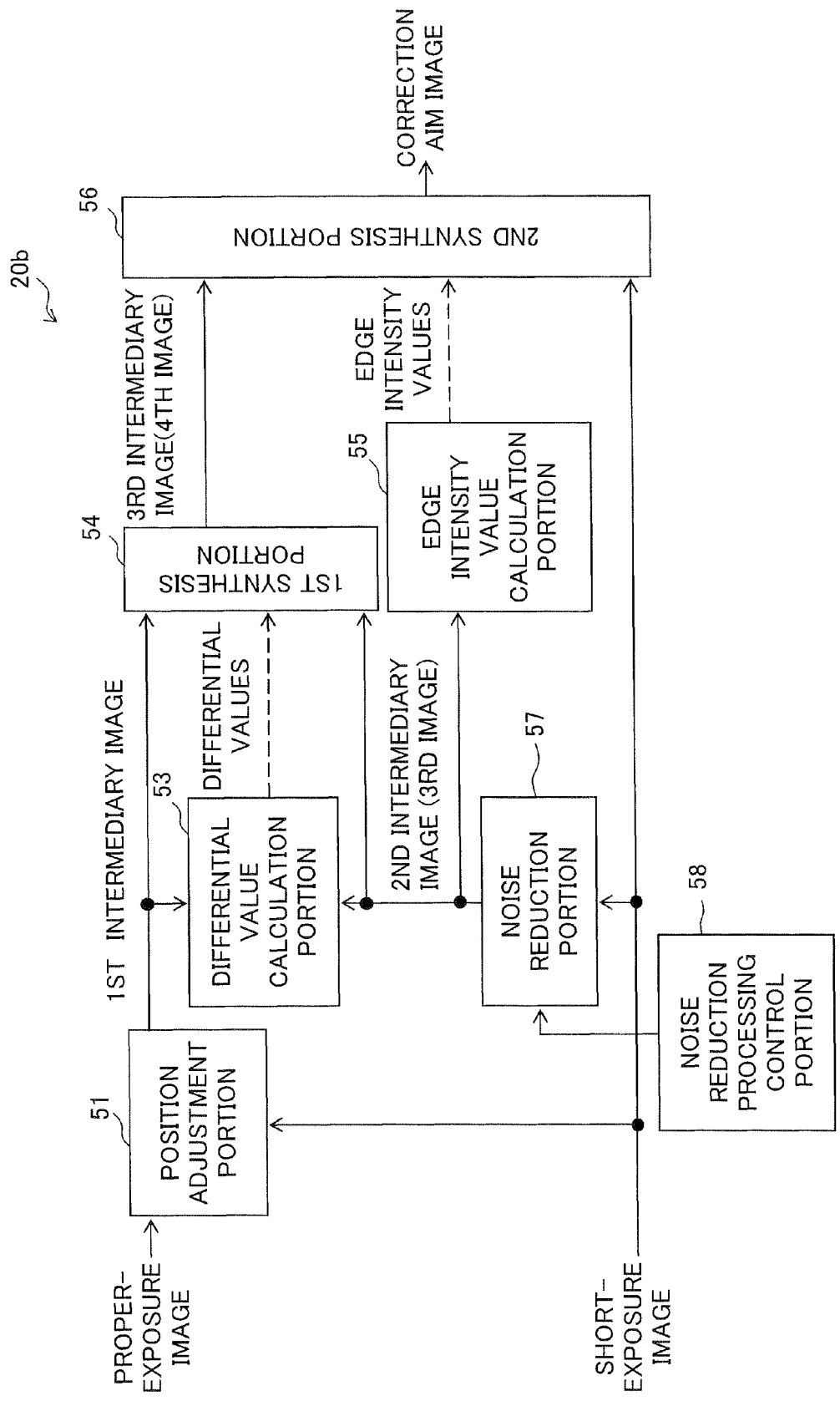
FIG. 15 is an internal block diagram of an image correction portion according to Example 2 of the invention.

FIG. 15 is an internal block diagram of an image correction portion 20b according to Example 2. In Example 2, the image correction portion 20b is used as the image correction portion 20 in FIG. 1. The image data of the short- and proper-exposure images shot is fed to the image correction portion 20b.

The image correction portion 20b is provided with blocks identified by the reference signs 51, 53 to 56, 57, and 58. Specifically, compared with the image correction portion 20a in FIG. 5, the image correction portion 20b additionally has a noise reduction processing control portion 58 (hereinafter abbreviated to the control portion 58), and has a noise reduction portion 57 in place of the noise reduction portion 52 in the image correction portion 20a.

Like the noise reduction portion 52 in FIG. 5, the noise reduction portion 57 performs noise reduction processing for reducing noise in the short-exposure image, and outputs the noise-reduced short-exposure image as a second intermediary image. Here, however, the contents of the noise reduction processing in the noise reduction portion 57 are variable, and are varied by the control portion 58 according to the noise level in the short-exposure image.

Figure 16:
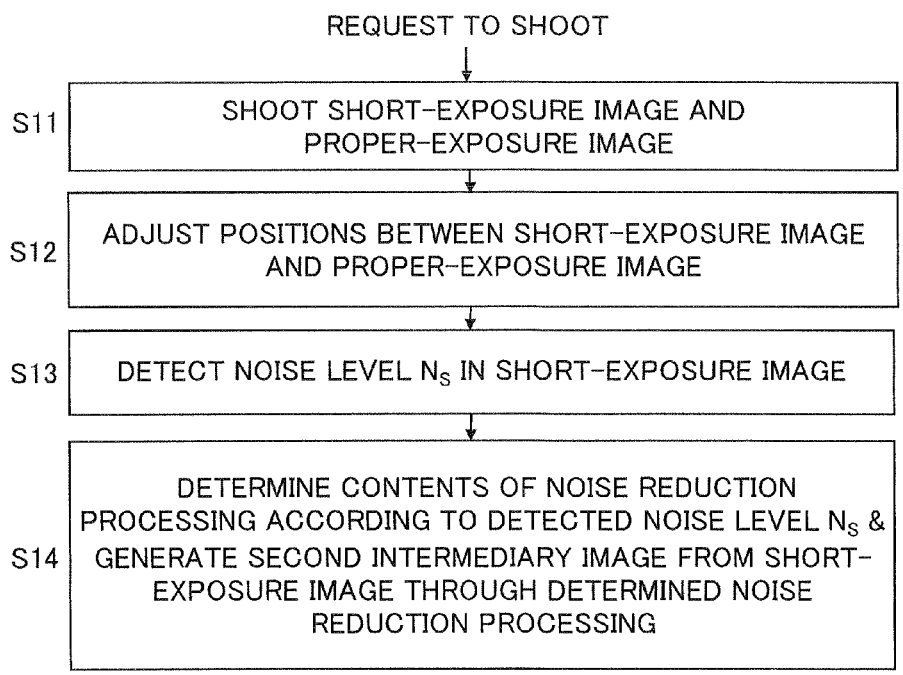
FIG. 16 is a flow chart showing the flow of operation for generating a second intermediary image according to Example 2 of the invention.

With reference to the flow chart in FIG. 16, the flow of operation through which the image correction portion 20b generates the second intermediary image will be described. First, when the shutter release button 17a is pressed to request shooting, in step S11, according to the method described with regard to Example 1, a short-exposure image and a proper-exposure image are shot consecutively. The image data of the short- and proper-exposure images obtained by the shooting is fed to the image correction portion 20b. As described with regard to Example 1, the exposure time $T_{SH}$ for the short-exposure image is shorter than the exposure time $T_{OP}$ for the proper-exposure image.

Subsequently to step S11, in step S12, according to the method described with regard to Example 1, the position adjustment portion 51 detects the displacement between the short- and proper-exposure images, and based on the detected displacement performs position adjustment between the short- and proper-exposure images.

Figure 17A:
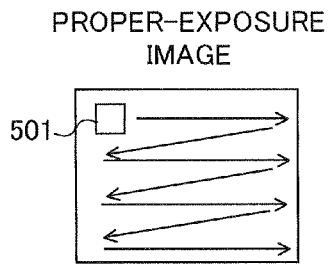
FIG. 17A is a diagram showing how a flat region is searched for within a proper-exposure image.
Figure 17B:
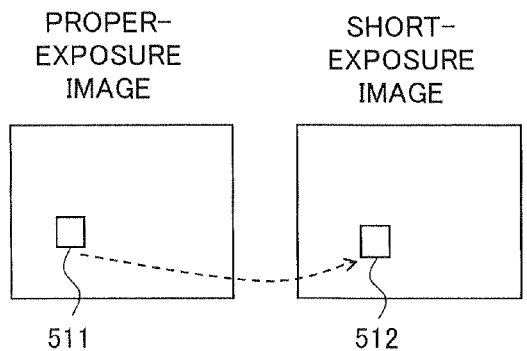
FIG. 17B is a diagram showing a flat region within a proper-exposure image and a short-exposure image.

Thereafter, in step S13, the control portion 58 detects the noise level in the short-exposure image. The noise level in the short-exposure image can be detected based on the image data of the short- and proper-exposure images. With reference to FIGS. 17A and 17B, a specific example of the processing for detecting the noise level in the short-exposure image will now be described. The noise level here corresponds to a signal-to-noise ratio.

In the short-exposure image noise-level detection processing, first, a flat image region is searched for in the entire image region of the proper-exposure image. Specifically, as shown in FIG. 17A, an evaluation block 501 having a predetermined image size is set within the proper-exposure image; then, while the evaluation block 501 is moved, one pixel at a time, in the horizontal or vertical direction within the image region of the proper-exposure image, every time it is so moved, the standard deviation of the luminance values of individual pixels within the evaluation block 501 are found. Thus, a plurality of standard deviations are found. Then the position of the evaluation block 501 corresponding to the smallest of those standard deviations is identified, the image region within the evaluation block 501 located at that position is detected as a flat image region, and that image region is set as a flat region 511 (see FIG. 17B).

Next, based on the displacement between the short- and proper-exposure images detected in step S12, the image region within the short-exposure image corresponding to the flat region 511 is set as a flat region 512 (see FIG. 17B). In the flat regions 511 and 512, there exists the image data of the same object. Generally, the noise level of an image is represented by the positive square root of the standard deviation of the luminance values of individual pixels within that image. Accordingly, the control portion 58 finds the standard deviation $\sigma_S$ of the luminance values of individual pixels within the flat region 512 on the short-exposure image, and detects $\sqrt{\sigma_s}$ as the noise level $N_S$ of the short-exposure image. In the present specification, when i is a positive value, $\sqrt{i}$ represents the positive square root of i.

After detection of the noise level $N_S$, in step S14, the control portion 58 determines the contents of the noise reduction processing to be performed in the noise reduction portion 57. The noise reduction portion 57 applies noise reduction processing according to the thus determined contents to the short-exposure image to generate the second intermediary image.

For example, the noise reduction portion 57 is so configured as to be capable of performing first and second noise reduction processing. When the noise level $N_S$ is lower than a predetermined reference level $N_{TH}$, the first noise reduction processing is applied to the short-exposure image to generate the second intermediary image; when the noise level $N_S$ is equal to or higher than the reference level $N_{TH}$, the second noise reduction processing is applied to the short-exposure image to generate the second intermediary image. Here the first and second noise reduction processing are mutually different; specifically, the second noise reduction processing operates with higher intensity (with a stronger noise reduction effect) than the first noise reduction processing.

Figure 18A:
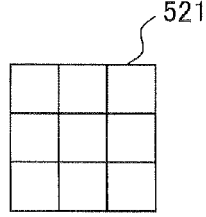
FIGS. 18A and 18B are diagrams showing spatial domain filters having sizes of 3×3 and 5×5 respectively.
Figure 18B:
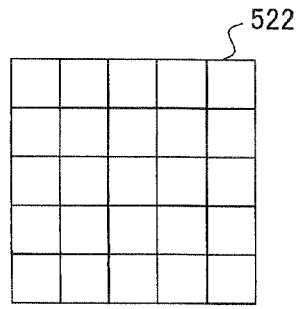

Usable as the first and second noise reduction processing is filtering (spatial domain filtering or frequency domain filtering) using a median filter, a low-pass filter, or the like. More specifically, for example, a median filter 521 with a filter size of 3×3 and a median filter 522 with a filter size of 5×5 as shown in FIGS. 18A and 18B are implemented in the noise reduction portion 57; in the first noise reduction processing, the short-exposure image is subjected to spatial domain filtering using the median filter 521 to generate the second intermediary image, and in the second noise reduction processing, the short-exposure image is subjected to spatial domain filtering using the median filter 522 to generate the second intermediary image. Since increasing the filter size of a median filter augments its noise reduction intensity (noise reduction effect), using two different median filters as described above makes it possible to adjust the intensity of noise reduction.

The first and second noise reduction processing can be realized on a hardware basis. In that case, for example, the circuits that function as the above-mentioned median filter 521 and 522 are separately implemented in the noise reduction portion 57. The first and second noise reduction processing, however, can also be realized with image processing, on a software basis. In a case where the noise reduction processing is realized on a software basis, the contents of the noise reduction processing can be changed easily without addition of a circuit.

The above-mentioned reference level $N_{TH}$ may be a fixed level set beforehand, or may be set according to the noise level $N_L$ of the proper-exposure image (the same applies also in the other examples described later). For example, the reference level $N_{TH}$ may be set at twice the noise level $N_L$ of the proper-exposure image. The noise level $N_L$ of the proper-exposure image is given, by use of the standard deviation $\sigma_L$ of the luminance values of individual pixels within the flat region 511 (see FIG. 17B), by $N_L = \sqrt{\sigma_L}$.

In the specific example described above, the contents of the noise reduction processing for generating the second intermediary image from the short-exposure image is switched in two steps according to the noise level $N_S$ in the short-exposure image; instead, the contents of the noise reduction processing may be switched in three or more steps according to the noise level $N_S$. For example, the noise reduction portion 57 is so configured as to be capable of performing first, second, and third noise reduction processing; when "$N_S < N_{TH1}$," the first noise reduction processing is selected; when "$N_{TH1} \leq N_S < N_{TH2}$," the second noise reduction processing is selected; and, when "$N_{TH2} \leq N_S$," the third noise reduction processing is selected (where $0 < N_{TH1} < N_{TH2}$). The selected noise reduction processing is then applied to the short-exposure image to generate the second intermediary image. Here, the first to third noise reduction processing are mutually different; specifically, while the first and second noise reduction processing are the same as those described above, the third noise reduction processing operates with still higher intensity (with a still stronger noise reduction effect) than the second noise reduction processing.

In the specific example described above, the search for the flat region 511 (see FIG. 17B) is done based on the luminance values of individual pixels within the evaluation block 501; instead, the search may be done by use of pixel signal values different from luminance values. For example, the search may be done based on the R, G, and B signal values, or the U and V signal values (the values of color-difference signals), of individual pixels within the evaluation block 501.

In the specific example described above, the search for the flat regions 511 and 512 is done after position adjustment between the short- and proper-exposure images; instead, the search may be done before position adjustment between the short- and proper-exposure images to detect the noise level $N_S$. In that case, however, the search for the flat region 511 needs to be followed by processing (such as block matching processing) for the search for the flat region 512. Thus, from the viewpoint of reducing the search time, it is preferable to do the search for the flat regions 511 and 512 after position adjustment between the short- and proper-exposure images.

The operation of the blocks other than the noise reduction portion 57 and the control portion 58 within the image correction portion 20b is the same as described with regard to Example 1. Thus, the short-exposure image fed to the image correction portion 20b, the first intermediary image generated in the position adjustment portion 51, and the second intermediary image generated in the noise reduction portion 57 are synthesized by the first and second synthesis portions 54 and 56 to generate the correction aim image.

By making the contents of noise reduction processing variable according to the noise level in the short-exposure image as in Example 2, it is possible to perform noise reduction processing having a noise reduction effect adequate for the noise level in the short-exposure image, and thus it is possible to obtain a satisfactory correction aim image.

Example 3

Next, Example 3 of the invention will be described. As described above, realizing noise reduction processing on a software basis makes it easy to change the contents of the noise reduction processing without addition of a circuit. From the view point of processing speed etc., however, noise reduction processing is in practice more often realized on a hardware basis. When hardware is used, it is possible to implement a plurality of median filters (521, 522) as described with regard to Example 2, and it is also possible, with priority given to reduction of the circuit scale, to realize noise reduction processing with a single filter. Example 3 will accordingly deal with a method that uses single noise reduction processing.

Figure 19:
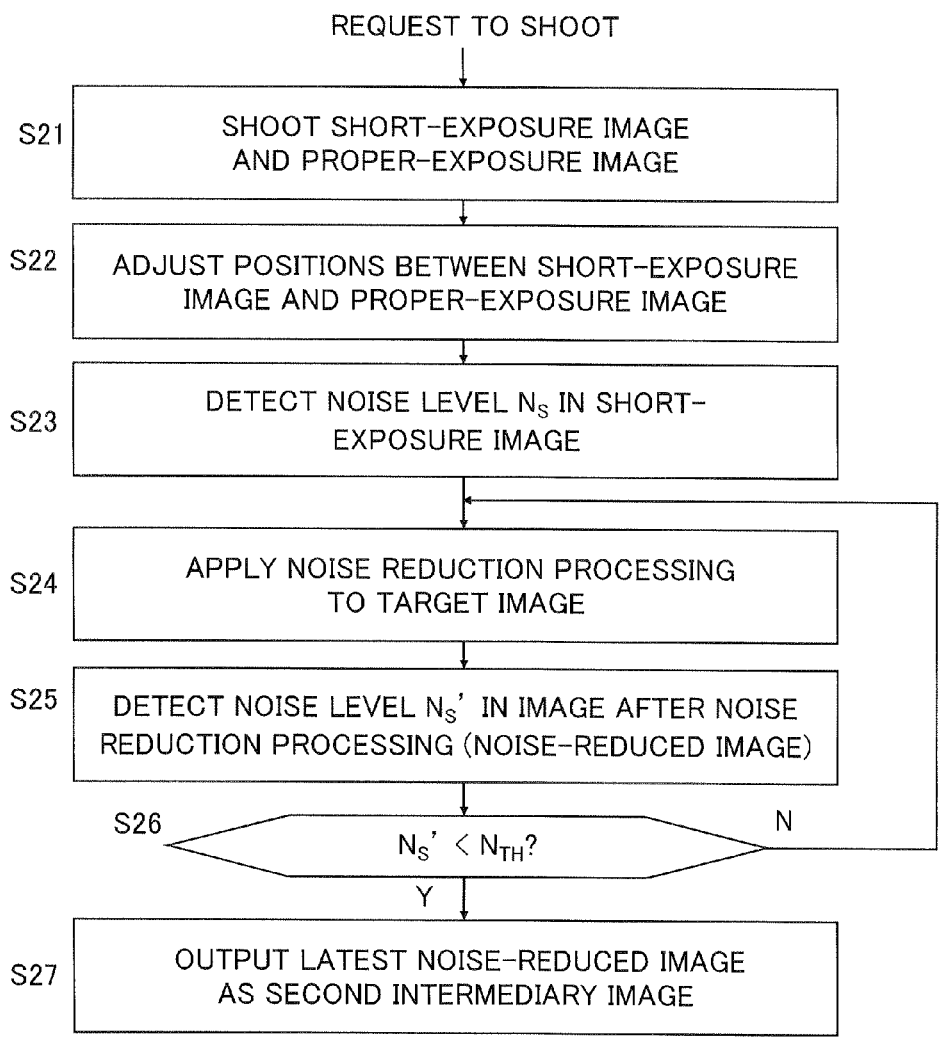
FIG. 19 is a flow chart showing the flow of operation for generating a second intermediary image according to Example 3 of the invention.

Also in Example 3, the image correction portion 20b in FIG. 15 is used as the image correction portion 20 in FIG. 1. FIG. 19 is a flow chart showing the flow of operation for generating the second intermediary image according to Example 3. The operation will now be described with reference to the flow chart in FIG. 19.

When the shutter release button 17a is pressed to request shooting, the processing in steps S21 through S23 is performed. The processing in steps S21 through S23 is the same as the processing in steps S11 through S13 in FIG. 16. Specifically, in response to a request to shoot, a short-exposure image and a proper-exposure image are shot, then position adjustment is performed between the two images, and then, in step S23, the noise level $N_S$ in the short-exposure image is detected. The processing for detection of the noise level $N_S$ in step S23 may be omitted.

After the processing in steps S21 through S23, in step S24, the noise reduction portion 57 applies noise reduction processing to a noise reduction target image to generate a noise-reduced image. Subsequently, in step S25, the control portion 58 detects the noise level $N_S'$ in the thus generated noise-reduced image. The noise reduction processing performed in step S24 is, for distinction from that in Example 2, represented especially by $NR_{FIX}$.

As will be clear from what is going to be described, the noise reduction processing $NR_{FIX}$ in step S24 can be performed more than once. In the noise reduction processing $NR_{FIX}$ performed for the first time, the target image is the short-exposure image fed to the image correction portion 20b. Thus the noise-reduced image obtained through the noise reduction processing $NR_{FIX}$ performed for the first time is an image I[1] obtained by performing the noise reduction processing $NR_{FIX}$ once on the short-exposure image fed to the image correction portion 20b. In the noise reduction processing $NR_{FIX}$ performed for the second time, the target image is I[1], and the noise-reduced image obtained through the noise reduction processing $NR_{FIX}$ performed for the second time is an image I[2] obtained by performing the noise reduction processing $NR_{FIX}$ once on the image I[1]. The noise reduction processing $NR_{FIX}$ performed for the third time and later proceeds in similar manners. In this way, every time the noise reduction processing $NR_{FIX}$ is performed, the noise-reduced image (I[1], I[2], I[3], . . . ) becomes updated.

The noise reduction processing $NR_{FIX}$ is similar to the noise reduction processing performed in the noise reduction portion 52 in FIG. 5, and the contents of the noise reduction processing $NR_{FIX}$ are constant irrespective of the number of times it is performed. For example, in a case where the noise reduction processing $NR_{FIX}$ is spatial domain filtering using the median filter 521 in FIG. 18A, in the noise reduction processing $NR_{FIX}$ performed for each of the first, second, . . . , and nth times, spatial domain filtering using the median filter 521 is performed on the target image, so that the noise-reduced images I[1], I[2], . . . , and I[n] are generated one after the other (where n is a natural number).

The noise level $N_S'$ detected in step S25 is the noise level in the latest noise-reduced image obtained through the noise reduction processing $NR_{FIX}$ performed more than once. Accordingly, when the noise reduction processing $NR_{FIX}$ has been performed n times, the noise level in the noise-reduced image I[n] is detected as the noise level $N_S'$ (where n is a natural number). The noise level in the noise-reduced image I[n] is represented by the positive square root of the standard deviation of the luminance values of individual pixels within a flat region on the noise-reduced image I[n]. The flat region on the noise-reduced image I[n] is an image region on the noise-reduced image I[n] that is located at the same position as the flat region 512 on the short-exposure image (see FIG. 17B), and in the flat region on the noise-reduced image I[n] and in the flat region 512 on the short-exposure image, there exists the image data of the same subject.

After the noise level $N_S'$ is detected in step S25, in step S26, the control portion 58 compares the latest noise level $N_S'$ with a predetermined reference level $N_{TH}$. If "$N_S' \geq N_{TH}$" holds, it is judged that the number of times the noise reduction processing $NR_{FIX}$ has been performed is insufficient, and a return is made to step S24, where the noise reduction processing $NR_{FIX}$ and the detection of noise level $N_S'$ are performed again. By contrast, if "$N_S' < N_{TH}$" holds, an advance is made from step S26 to step S27. In step S27, the latest noise-reduced image obtained through the noise reduction processing $NR_{FIX}$ performed more than once is outputted as the second intermediary image from the noise reduction portion 57.

In this way, the noise reduction processing $NR_{FIX}$ is performed repeatedly until the noise level $N_S'$ in the noise-reduced image becomes lower than the reference level $N_{TH}$. However, if the noise level $N_S'$ in the noise-reduced image does not become lower than the reference level $N_{TH}$ even when the noise reduction processing $NR_{FIX}$ has been performed repeatedly a predetermined number of times, the latest noise-reduced image obtained through the noise reduction processing $NR_{FIX}$ performed that predetermined number of times is outputted as the second intermediary image from the noise reduction portion 57.

The operation of the blocks other than the noise reduction portion 57 and the control portion 58 within the image correction portion 20b is the same as described with regard to Example 1. Thus, the short-exposure image fed to the image correction portion 20b, the first intermediary image generated in the position adjustment portion 51, and the second intermediary image generated in the noise reduction portion 57 are synthesized by the first and second synthesis portions 54 and 56 to generate the correction aim image.

Example 3 achieves the same effect as Example 2. In particular, Example 3 is suitable in cases where the noise reduction portion 57 is formed on a hardware basis.

In the example of operation in FIG. 19, the number of times the noise reduction processing $NR_{FIX}$ is performed remains indefinite until the unequality "$N_S' < N_{TH}$" is found to hold; instead, the number of times the noise reduction processing $NR_{FIX}$ is performed may be set beforehand according to the noise level $N_S$ in the short-exposure image as detected in step S23. In that case, the noise reduction processing $NR_{FIX}$ in step S24 is performed the set number of times, and the latest noise-reduced image obtained as a result is outputted as the second intermediary image from the noise reduction portion 57. Here, the number to be set as that of repetition of the noise reduction processing $NR_{FIX}$ increases stepwise as the noise level $N_S$ increases.

Example 4

Next, Example 4 of the invention will be described. As described previously with reference to FIG. 14, when the entire image region 400 of the short-exposure image and the entire image region 401 of the position-adjusted proper-exposure image are mapped on a common two-dimensional coordinate system XY, an overlap region 402 and a non-overlap region 403 are formed. While it is possible, as described with regard to Example 1, to generate the correction aim image such that it has as its entire image region the overlap region 402, if the non-overlap region 403 is large, the correction aim image may have too small an angle of view (field of view) compared with that of the short- or proper-exposure images.

In such a case, as described with regard to Example 1, by generating the pixel signals within the overlap region 402 on the correction aim image from the pixel signals within the overlap region 402 on the short- and proper-exposure images on one hand and generating the pixel signals within the non-overlap region 403 on the correction aim image from the short-exposure image alone on the other hand, and then fitting the overlap region 402 and the non-overlap region 403 on the correction aim image together, it is possible to make the angle of view (field of view) of the correction aim image identical with that of the short-exposure image (it is however also possible to generate the correction aim image such that it has as its entire image region the overlap region 402 irrespective of the size of the non-overlap region 403). In Example 4, this method is used to generate the correction aim image such that it has the same angle of view as the short-exposure image.

In this case, however, since the image within the overlap region 402 and the image within the non-overlap region 403 both on the correction aim age are generated by different methods, if no additional processing is performed, the fitting boundary on the correction aim image may be visible (the difference in noise level between the overlap and non-overlap regions 402 and 403 may be visible). Example 4 will deal with a method of dealing with that problem.

Figure 20:
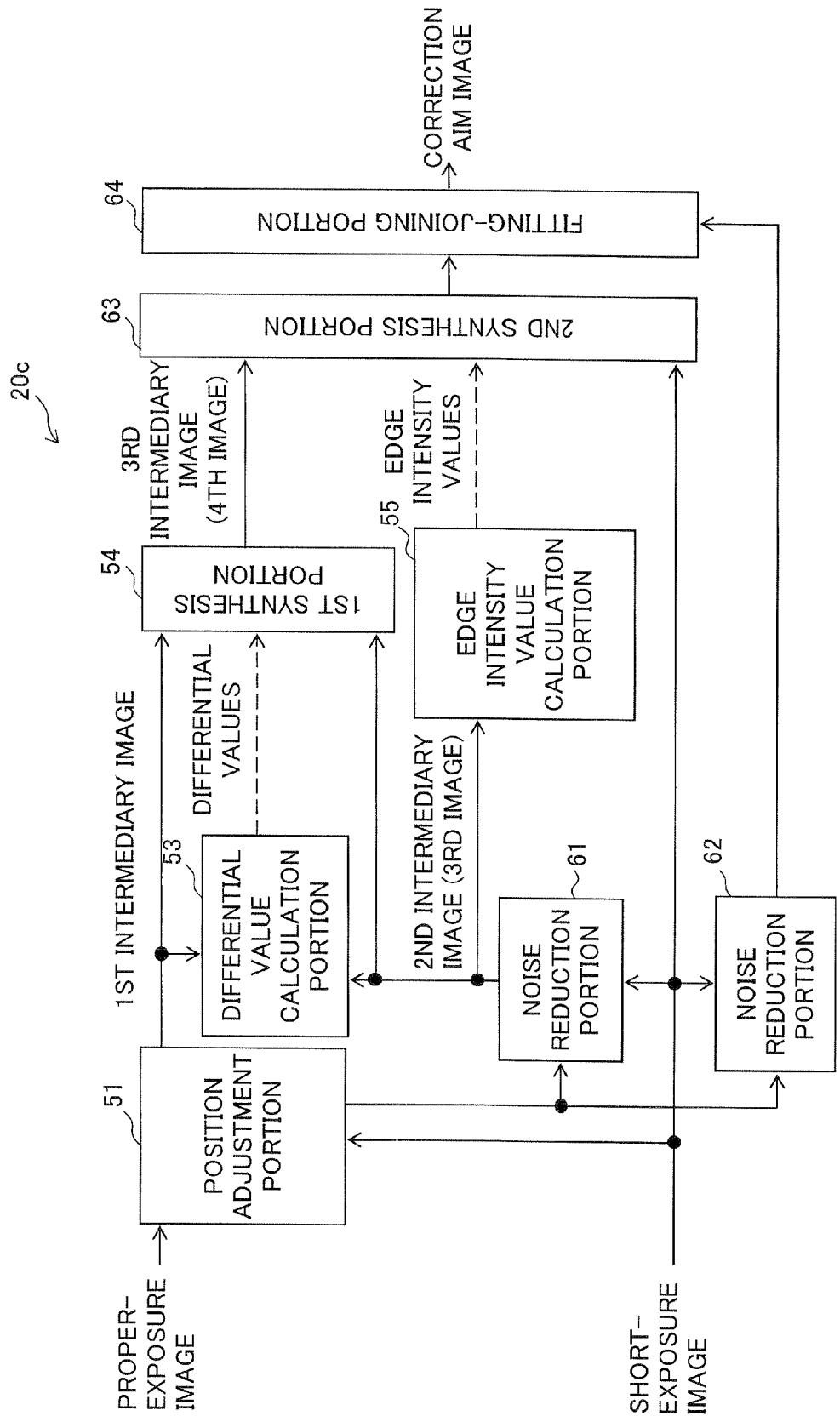
FIG. 20 is an internal block diagram of an image correction portion according to Example 4 of the invention.

FIG. 20 is an internal block diagram of an image correction portion 20c according to Example 4. In Example 4, the image correction portion 20c is used as the image correction portion 20 in FIG. 1. The image data of the short- and proper-exposure images shot is fed to the image correction portion 20c.

The image correction portion 20c is provided with blocks identified by the reference signs 51, 53 to 55, and 61-64. The blocks identified by the reference signs 51 and 53 to 55 function in the same way as those in the image correction portion 20a in FIG. 5.

When the shutter release button 17a is pressed to request shooting, according to the method described with regard to Example 1, a short-exposure image and a proper-exposure image are shot consecutively, and the image data of the short- and proper-exposure images obtained by the shooting is fed to the image correction portion 20c. Then, according to the method described with regard to Example 1, the position adjustment portion 51 detects the displacement between the short- and proper-exposure images, and based on the detected displacement performs position adjustment between the short- and proper-exposure images. It is here assumed that, as described previously, when the entire image region 400 of the short-exposure image and the entire image region 401 of the position-adjusted proper-exposure image are mapped on a common two-dimensional coordinate system XY, a overlap region 402 and a non-overlap region 403 are formed (see FIG. 14).

Figure 21:
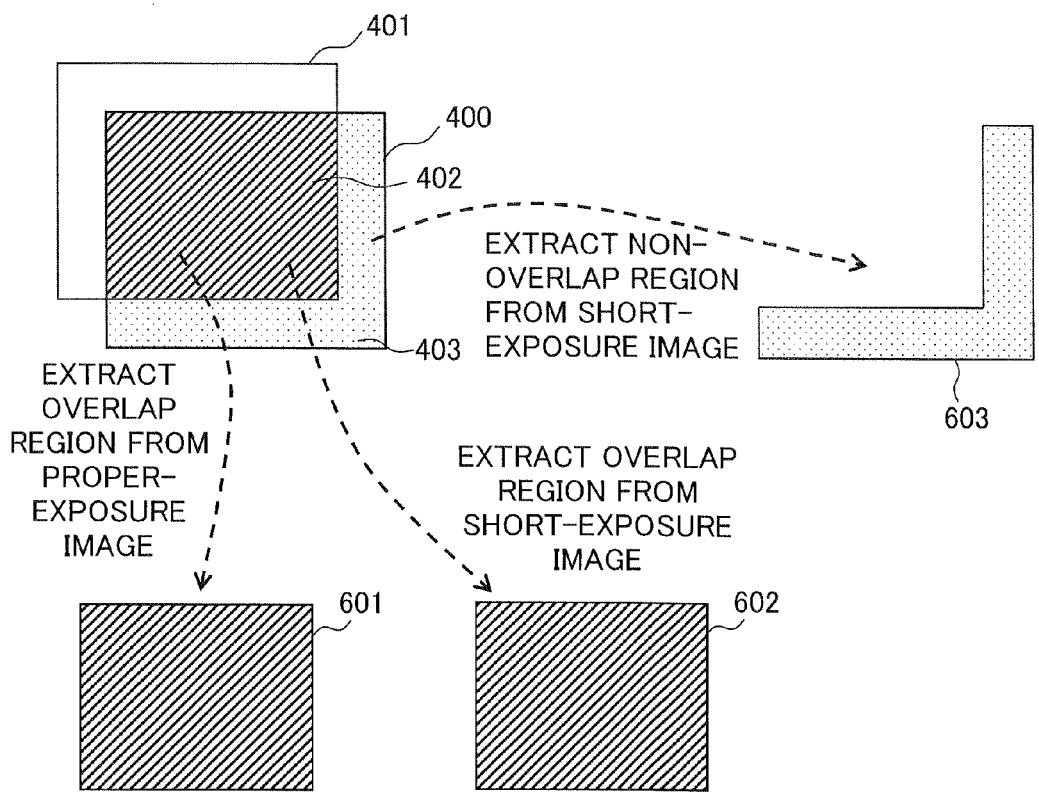
FIG. 21 is a diagram showing how an overlap region and a non-overlap region are defined in position-adjusted short- and proper-exposure images, and how the overlap region on the proper-exposure image and the overlap and non-overlap regions on the short-exposure image are extracted.

Based on the result of detection of the above-mentioned displacement, the image correction portion 20c (e.g., noise reduction portions 61 and 62) extracts, from the entire image region 400 of the short-exposure image, the overlap region 402 and the non-overlap region 403 on it separately. As shown in FIG. 21, the images within the overlap and non-overlap regions 402 and 403 on the short-exposure image that are obtained as a result of the extraction are taken as images 602 and 603 respectively. On the other hand, the image within the overlap region 402 on the proper-exposure image is taken as an image 601.

The image data of the image 601 is outputted as the image data of the first intermediary image from the position adjustment portion 51. The noise reduction portion 61 applies noise reduction processing to the image 602, which is a partial image of the short-exposure image, to reduce noise in the image 602. In Example 4, the noise-reduced image 602 (a first noise-reduced image) serves as the second intermediary image. On the other hand, the noise reduction portion 62 applies noise reduction processing to the image 603, which is the remaining partial image of the short-exposure image, to reduce noise in the image 603. The image data of the noise-reduced image 603 (a second noise-reduced image) is fed to a fitting-joining portion 64.

The operation that the differential value calculation portion 53 performs to calculate the differential values DIF(x, y) based on the first and second intermediary images is the same as in Example 1; the operation for synthesizing the first and second intermediary images according to the differential values to generate the third intermediary image is the same as in Example 1. Also the operation that the edge intensity value calculation portion 55 performs to calculate the edge intensity values E(x, y) based on the second intermediary image is the same as in Example 1.

A second synthesis portion 63 mixes the pixel signals of the short-exposure image and the third intermediary image at a mix ratio β(x, y) according to the edge intensity values E(x, y), and thereby calculates the pixel signals $P_{OUT}(x, y)$ of the correction aim image. The calculation method here is the same as that described with regard to Example 1. Here, however, the second synthesis portion 63 only calculates the pixel signals $P_{OUT}(x, y)$ within the overlap region 402 on the correction aim image.

Figure 22:
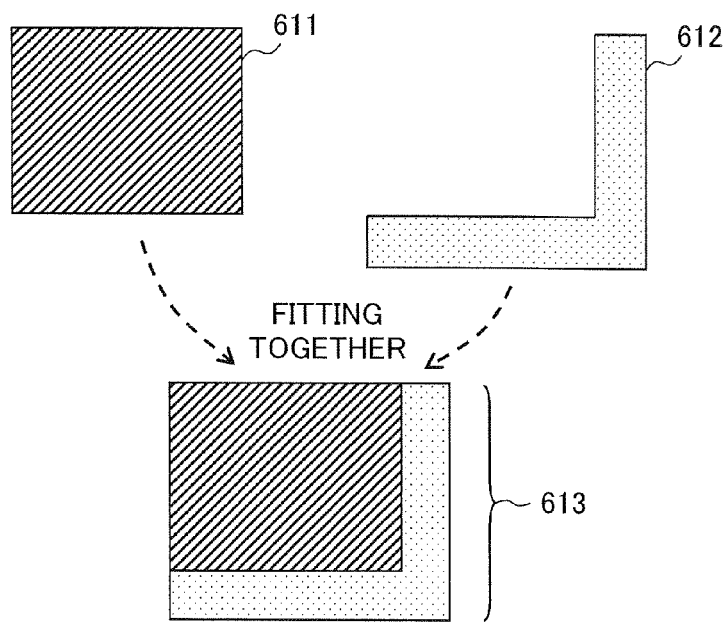
FIG. 22 is a diagram showing how two images are fitted together and joined together according to Example 4 of the invention.

The image data (pixel signals) of the image 603 after noise reduction processing by the noise reduction portion 62 is fed to the fitting-joining portion 64. The pixels of the image 603 are located within the non-overlap region 403. The fitting joining portion 64 handles, as the pixel signals within the non-overlap region 403 on the correction aim image, the pixel signals of the noise-reduced image 603 as represented by the output data of the noise reduction portion 62, and as shown in FIG. 22 fits together (in other words joins together) the output image 611 of the second synthesis portion 63 and the output image 612 of the noise reduction portion 62, and thereby forms the entire image region 613 of the correction aim image. The output image 611 of the second synthesis portion 63 is the image within the overlap region 402 represented by the pixel signals $P_{OUT}(x, y)$, and the output image 612 of the noise reduction portion 62 is the noise-reduced image 603.

Usable as the noise reduction processing (hereinafter referred to as the noise reduction processing $NR_A$) performed on the image 602 in the noise reduction portion 61 and the noise reduction processing (hereinafter referred to as the noise reduction processing $NR_B$) performed on the image 603 in the noise reduction portion 62 is noise reduction processing similar to that by the noise reduction portion 52 described with regard to Example 1. The noise reduction processing $NR_A$ and $NR_B$, when compared, have mutually different contents.

The image data in the overlap region 402 on the correction aim image is generated by weighted addition of pixel signals between images based on the short- and proper-exposure images; accordingly, even when noise reduction processing with relatively low noise reduction intensity is used as the noise reduction processing $NR_A$, it is possible to obtain a satisfactory result image with no visible noise. On the other hand, the image data in the non-overlap region 403 on the correction aim image is generated from the short-exposure image alone; accordingly, when noise reduction processing with relatively low noise reduction intensity is used as the noise reduction processing $NR_B$, noise is not eliminated satisfactorily, with the result that a difference in noise level between the overlap and non-overlap regions on the correction aim image may be visually recognizable, making the fitting boundary visible.

Thus, the first and second noise reduction processing described with regard to Example 2 can be used as the noise reduction processing $NR_A$ and $NR_B$. As described with regard to Example 2, the second noise reduction processing used as the noise reduction processing $NR_B$ operates with higher noise reduction intensity (with a stronger noise reduction effect) than the first noise reduction processing.

Instead, it is possible to use the noise reduction processing $NR_{FIX}$ described with regard to Example 3 and vary the number of times it is performed to make the noise reduction processing $NR_A$ and $NR_B$ different. Specifically, as the noise reduction processing $NR_A$, the noise reduction processing $NR_{FIX}$ is performed $k_A$ times on the image 602 and, as the noise reduction processing $NR_B$, the noise reduction processing $NR_{FIX}$ is performed $k_B$ times on the image 603. Here, $k_A$ and $k_B$ are predetermined integers that fulfill $1 \leq k_A < k_B$. Typically $k_A$ is set at 1. Instead it is possible to determine the value of $k_A$ on the noise level $N_S$ in the short-exposure image according to the method described with regard to Example 3 and determine, in a coordinated fashion, the value of $k_B$ based on the noise level $N_S$.

In connection with the contents of processing here (determining the value of $k_A$ based on the noise level $N_S$), the technical features described with regard to Example 2 or 3 may be applied in Example 4. Specifically, for example, it is possible to provide the image correction portion 20c further with the control portion 58 in FIG. 15, replace the noise reduction portion 61 with the noise reduction portion 57 in FIG. 15, and make the thus obtained noise reduction portion 57 in the image correction portion 20c to perform noise reduction processing based on the noise level $N_S$ as described with regard to Example 2 or 3. In that case, the noise reduction portion 57 in the image correction portion 20c applies noise reduction processing to the image 602, and the contents of the noise reduction processing are adjusted based the noise level $N_S$ by the control portion 58 according to the method described with regard to Example 2 or 3.

According to Example 4, the fitting boundary in the correction aim image is less visible.

Example 5

Figure 23:
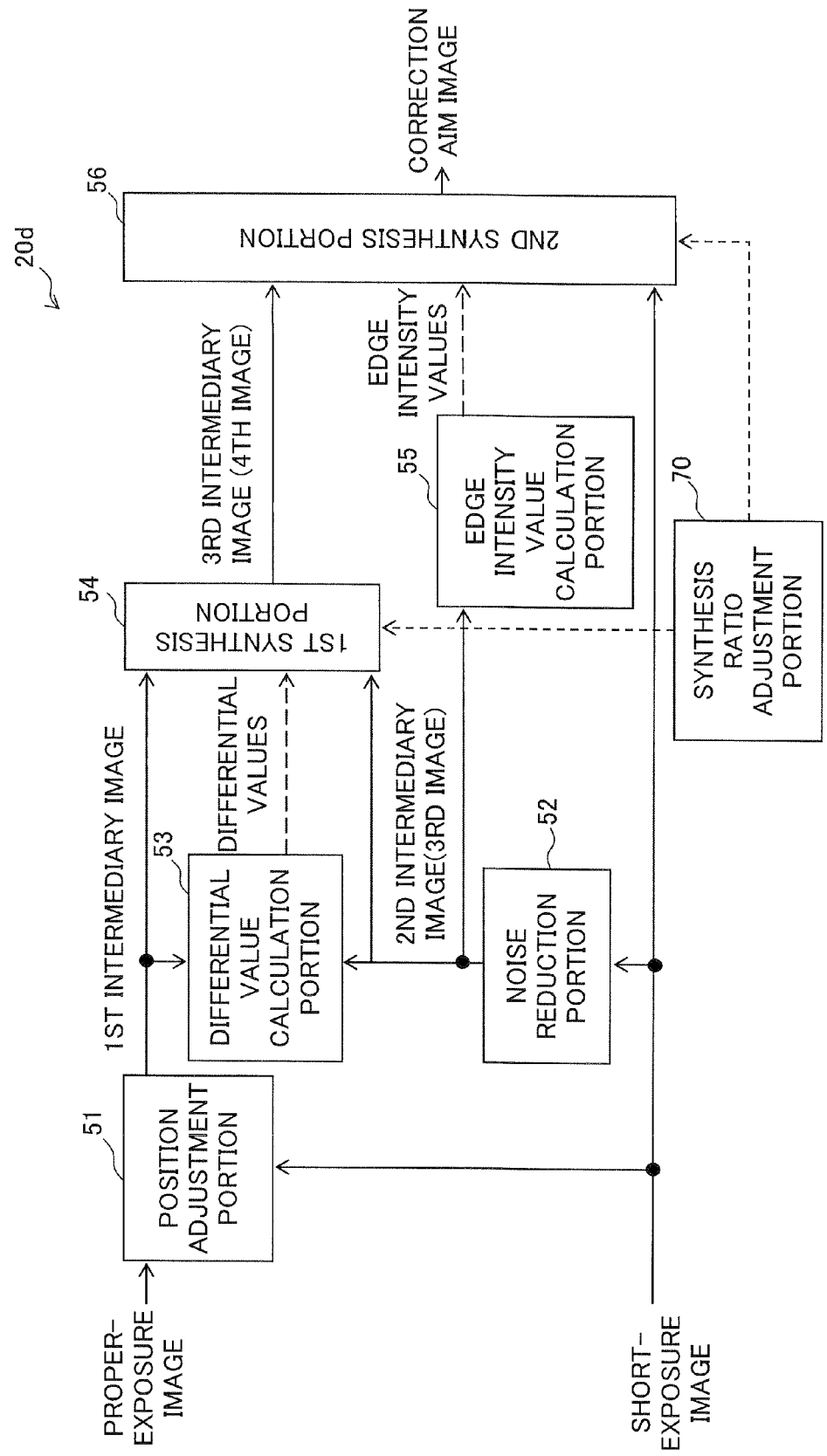
FIG. 23 is an internal block diagram of an image correction portion according to Example 5 of the invention.
Figure 24:
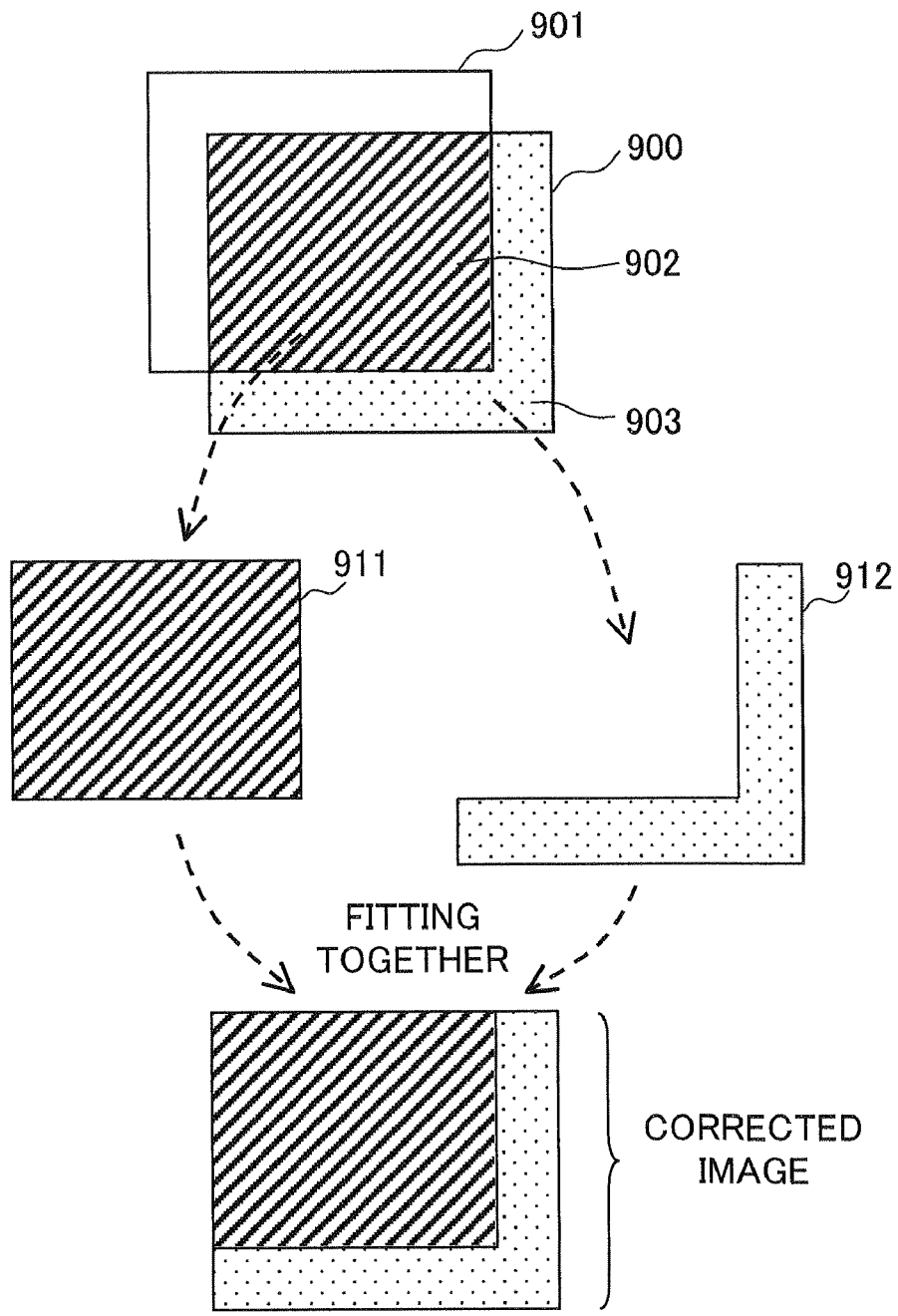
FIG. 24 is a diagram showing, with regard to a conventional technology, a positional relationship between the image region of a first image and the image region of a second image, both position-adjusted, and how a corrected image is generated from the position-adjusted first and second images.

Next, Example 5 of the invention will be described. FIG. 23 is an internal block diagram of an image correction portion 20d according to Example 5. In Example 5, the image correction portion 20d is used as the image correction portion 20 in FIG. 1. The image data of the short- and proper-exposure images shot is fed to the image correction portion 20d.

The image correction portion 20d is provided with blocks identified by the reference signs 51 to 56 and 70. The blocks identified by the reference signs 51 to 56 function in the same way as those in the image correction portion 20a in FIG. 5. Accordingly, the first synthesis portion 54 converts the differential value DIF(x, y) to the mix ratio α(x, y) under a first conversion condition as shown in FIG. 9, and at the resulting mix ratio α(x, y) mixes the pixel signals of the first and second intermediary images. On the other hand, the second synthesis portion 56 converts the edge intensity value E(x, y) to the mix ratio α(x, y) under a second conversion condition as shown in FIG. 12, and at the resulting mix ratio β(x, y) mixes the pixel signals of the third intermediary image and the short-exposure image.

In the image correction portion 20d, however, a synthesis ratio adjustment portion 70 variably sets the first conversion condition according to the noise level $N_S$ in the short-exposure image to adjust the synthesis ratio between the first and second intermediary images (the mix ratio at which their pixel signals are mixed), and also variably sets the second conversion condition according to the noise level $N_S$ in the short-exposure image to adjust the synthesis ratio between the third intermediary image and the short-exposure image (the mix ratio at which their pixel signals are mixed). In the image correction portion 20d (e.g., the synthesis ratio adjustment portion 70), the noise level $N_S$ in the short-exposure image is detected. The method of detecting the noise level $N_S$ is the same as that described previously.

Specifically, for example, the first conversion condition is variably set such that, as the noise level $N_S$ increases, the degree of contribution (1−α(x, y)) of the second intermediary image to the third intermediary image decreases (see formula (4) above, and FIG. 9). That is, for example, as the noise level $N_S$ increases with respect to a given predetermined level, either the threshold value T1$h$_L is increased while the threshold value Th1_H is kept constant, or both the threshold values Th1_L and Th1_H are increased, within the range in which "0<Th1_L<Th1_H" holds. Thus, as the noise level $N_S$ increases, the range of the value of the differential value DIF(x, y) in which α(x, y) is given a value equal to or close to 1 widens, and as a result the above-mentioned degree of contribution (1−α(x, y)) tends to decrease.

Moreover, specifically, for example, the second conversion condition is variably set such that, as the noise level $N_S$ increases, the degree of contribution β(x, y) of the short-exposure image to the correction aim image decreases (see formula (6) above, and FIG. 12). That is, for example, as the noise level $N_S$ increases with respect to a given predetermined level, either the threshold value Th2_L is increased while the threshold value Th2_H is kept constant, or both the threshold values Th2_L and Th2_H are increased, within the range in which "0<Th2_L<Th2_H" holds. Thus, as the noise level $N_S$ increases, the range of the value of the edge intensity value E(x, y) in which β(x, y) is given a value equal to or close to 0 widens, and as a result the above-mentioned degree of contribution β(x, y) tends to decrease.

In a comparison between the short- and proper-exposure images, the noise level $N_S$ in the short-exposure image is comparatively high; in particular, when the noise level $N_S$ is judged to be too high, the noise reduction processing by the noise reduction portion 52 may not reduce noise satisfactorily, and relatively much noise remaining in the second intermediary image may mix, via the third intermediary image, into the correction aim image. Moreover, in the synthesis processing in the second synthesis portion 56, noise in the short-exposure image directly mixes into the correction aim image according to β(x, y), and therefore, when the noise level $N_S$ in the short-exposure image is too high, giving priority to reducing noise in the correction aim image even at a slight sacrifice of edge sharpness in the correction aim image helps obtain a well-balanced correction aim image. In view of this, as described above, the synthesis ratio between the short-exposure image and the second intermediary image based on it in the synthesis processing for generating the correction aim image is adjusted, by being increased or decreased, according to the noise level $N_S$. This makes it possible to obtain a correction aim image that has blur and noise reduced with a satisfactory balance.

In the specific example described above, the first and second conversion conditions are both variably set according to the noise level $N_S$. Instead, one of the first and second conversion conditions may be variably set according to the noise level $N_S$, while the other is kept constant.

Modifications and Variations

The specific values given in the description above are merely examples, which, needless to say, may be modified to any other values. In connection with the embodiments described above, modified examples or supplementary explanations applicable to them will be given below in Notes 1 and 2. Unless inconsistent, any part of the contents of these notes may be combined with any other.

Note 1: Although the above description deals with examples in which the image processing apparatus including the image correction portion (20, 20a, 20b, 20c, or 20d) is provided within the image sensing apparatus 1, the image correction portion (20, 20a, 20b, 20c, or 20d) may instead be provided in an image processing apparatus (unillustrated) external to the image sensing apparatus 1. In that case, the image correction portion (20, 20a, 20b, 20c, or 20d) included in that external image processing apparatus is fed with the image data of the short- and proper-exposure images obtained by shooting by the image sensing apparatus 1, so that the image correction portion (20, 20a, 20b, 20c, or 20d) included in that external image processing apparatus generates the image data of the correction aim image.

Note 2: The image sensing apparatus 1 may be realized in hardware, or in a combination of hardware and software. In particular, all or part of the processing performed within the image correction portion (20, 20a, 20b, 20c, or 20d) may be realized in hardware, in software, or in a combination of hardware and software. In a case where the image sensing apparatus 1 is built on a software basis, a block diagram with regard to the part realized with software serves as a functional block diagram of that part.

What is claimed is:

1. An image processing apparatus which generates, from a first image obtained by shooting and a second image obtained by shooting with an exposure time longer than an exposure time of the first image, a third image in which noise in the first image has been reduced and a fourth image which is a synthesized image of the second and third images, the image processing apparatus generating an output image by synthesizing the first and fourth images, the image processing apparatus comprising:

a synthesis ratio adjustment portion which adjusts, according to a noise level in the first image, at least one of a first synthesis ratio at which the second and third images are synthesized and a second synthesis ratio at which the first and fourth images are synthesized.

2. The image processing apparatus according to claim 1, wherein the first synthesis ratio is derived by applying a difference between the second and third images to a first predetermined conversion condition, and the second synthesis ratio is derived by applying intensity of an edge contained in the first or third image to a second predetermined conversion condition, and the synthesis ratio adjustment portion adjusts the at least one of the first and second synthesis ratios according to the noise level in the first image by adjusting at least one of the first and second conversion conditions according to the noise level in the first image.

3. An image sensing apparatus comprising:

an image sensing portion which acquires an image by shooting; and the image processing apparatus according to claim 1, wherein the first and second images are acquired by the image sensing portion.

* * * * *